(12) United States Patent
Takizawa et al.

(10) Patent No.: US 8,294,334 B2
(45) Date of Patent: Oct. 23, 2012

(54) ULTRASONIC MOTOR

(75) Inventors: Hiroyuki Takizawa, Chofu (JP); Akira Matsui, Hino (JP); Tomoki Funakubo, Tama (JP)

(73) Assignee: Olympus Corporation, Tokyo (JP)

( * ) Notice: Subject to any disclaimer, the term of this patent is extended or adjusted under 35 U.S.C. 154(b) by 79 days.

(21) Appl. No.: 13/019,449

(22) Filed: Feb. 2, 2011

(65) Prior Publication Data

US 2011/0187231 A1 Aug. 4, 2011

(30) Foreign Application Priority Data

Feb. 2, 2010 (JP) ................................. 2010-021047

(51) Int. Cl.
*H01L 41/08* (2006.01)
(52) U.S. Cl. ......... 310/323.02; 310/323.12; 310/323.16; 310/333
(58) Field of Classification Search ............. 310/323.02, 310/323.12, 323.16
See application file for complete search history.

(56) References Cited

U.S. PATENT DOCUMENTS

| | | | | |
|---|---|---|---|---|
| 5,345,137 A | * | 9/1994 | Funakubo et al. | 310/323.16 |
| 5,723,935 A | * | 3/1998 | Tomikawa et al. | 310/323.02 |
| 6,081,063 A | * | 6/2000 | Kasuga et al. | 310/323.02 |
| 6,252,332 B1 | * | 6/2001 | Takagi et al. | 310/323.02 |
| 6,469,419 B2 | * | 10/2002 | Kato et al. | 310/323.02 |
| 2010/0019621 A1 | * | 1/2010 | Funakubo et al. | 310/323.16 |

FOREIGN PATENT DOCUMENTS

JP H9-117168 5/1997

* cited by examiner

*Primary Examiner* — Mark Budd
(74) *Attorney, Agent, or Firm* — Scully, Scott, Murphy & Presser, P.C.

(57) ABSTRACT

In an ultrasonic motor, an elliptical vibration is generated by combining a longitudinal primary resonance vibration resulting from an expansion and a contraction of a vibrator in a direction of a central axis and a torsional secondary resonance vibration or a torsional tertiary resonance vibration resulting from twisting around the central axis. A dimension ratio of a rectangle of the vibrator is chosen such that a resonance frequency of the longitudinal primary resonance vibration and a resonance frequency of the torsional secondary resonance vibration or the torsional tertiary resonance vibration match. The vibrator includes a plurality of regions in a surface orthogonal to the central axis, and deformations of the regions adjacent to each other along the direction of the central axis are mutually different. The vibrator expands and contracts in a direction orthogonal to a polarization direction thereof.

3 Claims, 24 Drawing Sheets

100

ULTRASONIC MOTOR

CROSS-REFERENCE TO RELATED APPLICATION

The present application is based upon and claims the benefit of priority from the prior Japanese Patent Application No. 2010-021047 filed on Feb. 2, 2010; the entire contents of which are incorporated herein by reference.

BACKGROUND OF THE INVENTION

1. Field of the Invention

The present invention relates to ultrasonic motors.

2. Description of the Related Art

Japanese Patent Application Laid-open No. H9-117168, for example, discloses an ultrasonic motor that generates an elliptical vibration by combining a longitudinal vibration and a torsional vibration, and rotation drives a rotor. FIG. 1 of Japanese Patent Application Laid-open No. H9-117168 depicts an exploded perspective view of a vibrator. The vibrator has a structure in which a plurality of piezoelectric elements is arranged between elastic bodies that are cut obliquely with respect to an axis of the vibrator. Positive electrodes of the piezoelectric elements are divided into two groups. These groups will be called Phase A and Phase B electrodes.

The longitudinal vibration can be generated in a bar-shaped vibrator by applying alternating voltages of the same phase to both Phase A and Phase B electrodes. On the other hand, the torsional vibration can be generated in the bar-shaped vibrator by applying alternating voltages of opposite phases to both Phase A and Phase B electrodes. A position of a groove in the vibrator is adjusted such that a resonance frequency of the longitudinal vibration and a resonance frequency of the torsional vibration substantially match. When alternating voltages that differ by $\pi/2$ phase are applied to Phase A and Phase B electrodes, the longitudinal vibration and the torsional vibration are generated simultaneously, thereby generating an elliptical vibration on a top surface of a bar-shaped elastic body. In this state, by pressing the rotor on the top surface of the bar-shaped elastic body, the rotor can be rotation driven in a clockwise direction (CW direction) or a counterclockwise direction (CCW direction).

The ultrasonic motor disclosed in Japanese Patent Application Laid-open No. H9-117168 has various drawbacks. For example, as shown in FIG. 1, both the piezoelectric element and the elastic body are necessary, the elastic body must be cut obliquely, and the groove must be made in a portion of the elastic body to match the resonance frequencies of the longitudinal vibration and the torsional vibration. Thus, the overall structure of the conventional vibrator is very complicated.

SUMMARY OF THE INVENTION

The present invention is made in view of the above discussion. It is an object of the present invention to provide an ultrasonic motor that can generate a torsional resonance vibration efficiently by positively employing the bending movement of the piezoelectric element. It is another object of the present invention to provide an ultrasonic motor that includes a single part, has a simple structure without a groove etc., can generate a longitudinal vibration and a torsional vibration easily, can generate an elliptical vibration by combining the longitudinal vibration and the torsional vibration, and can rotate a rotor by the elliptical vibration.

To solve the above problems and to achieve the above objects, according to an aspect of the present invention, an ultrasonic motor includes a vibrator having a dimension ratio of a rectangle in a cross-section orthogonal to a central axis; and a rotor that contacts an elliptical vibration generating surface of the vibrator and that is rotation driven around the central axis that is orthogonal to the elliptical vibration generating surface of the vibrator. An elliptical vibration is generated by combining a longitudinal primary resonance vibration resulting from an expansion and a contraction of the vibrator in a direction of the central axis and a torsional secondary resonance vibration or a torsional tertiary resonance vibration resulting from twisting around the central axis. The dimension ratio of the rectangle of the vibrator is chosen such that a resonance frequency of the longitudinal primary resonance vibration and a resonance frequency of the torsional secondary resonance vibration or the torsional tertiary resonance vibration match. The vibrator includes a plurality of regions in a surface orthogonal to the central axis. Deformations of the regions adjacent to each other along the direction of the central axis are mutually different in the regions. The vibrator expands and contracts in a direction orthogonal to a polarization direction thereof.

In the ultrasonic motor mechanism according to the present invention, it is preferable that each of the regions among the regions is deformed in a single direction to generate the torsional secondary resonance vibration.

In the ultrasonic motor mechanism according to the present invention, it is preferable that each of the regions among the regions is deformed in a mutually different direction to generate the torsional tertiary resonance vibration.

DETAILED DESCRIPTION OF THE INVENTION

Exemplary embodiments of an ultrasonic motor according to the present invention are explained in detail below by using the accompanying drawings. The present invention is not limited by the following embodiments.

First Embodiment

Figure 1:
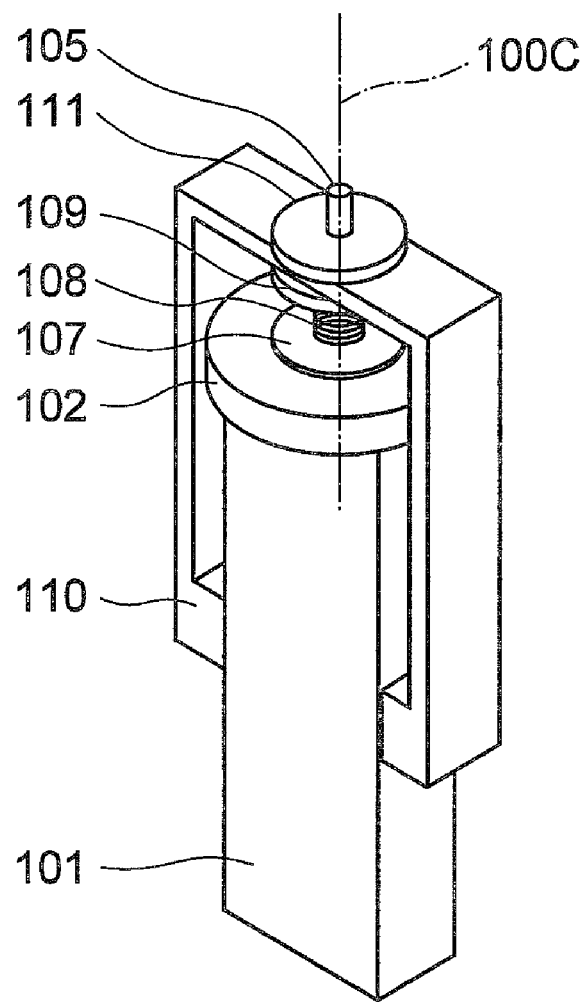
FIG. 1 is a perspective view of a structure of an ultrasonic motor according to a first embodiment of the present invention.
Figure 2:
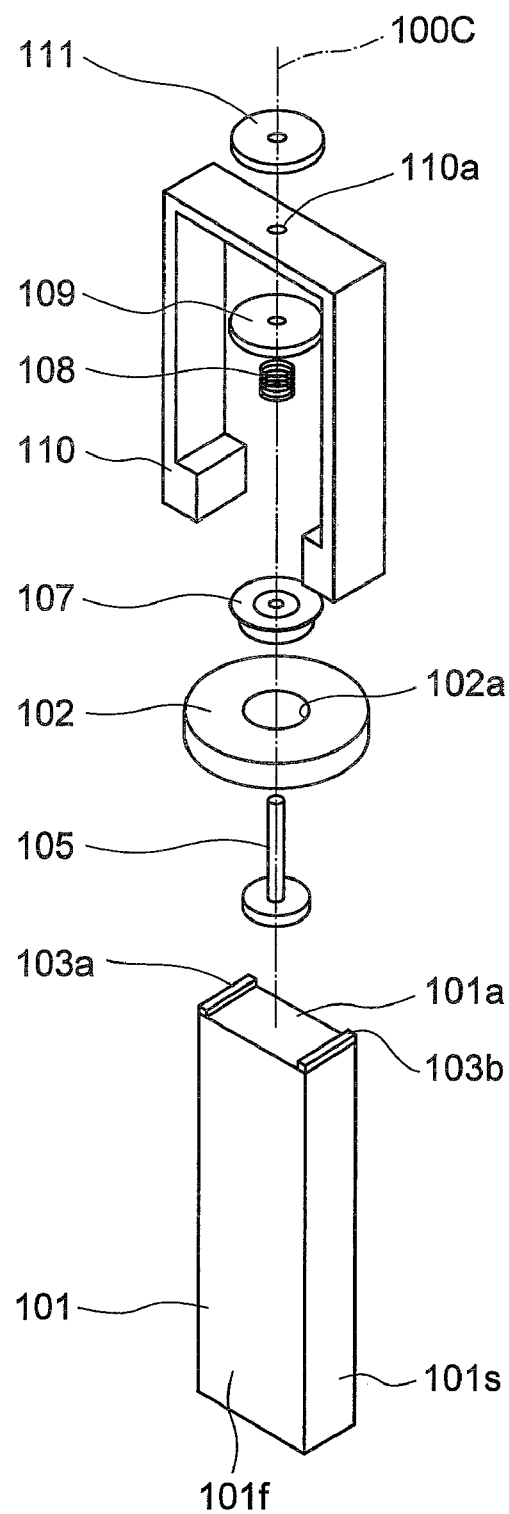
FIG. 2 is an exploded perspective view of the structure of the ultrasonic motor according to the first embodiment of the present invention.

An ultrasonic motor 100 according to the first embodiment of the present invention generates an elliptical vibration by combining a longitudinal primary resonance vibration and a torsional secondary resonance vibration. As shown in FIGS. 1 and 2, the ultrasonic motor 100 includes a vibrator 101 and a rotor 102.

The vibrator 101 is a piezoelectric element of a substantially right-angled parallelepiped shape having a dimension ratio of a rectangle in a cross-section orthogonal to its central axis 100C (rotation axis). The rotor 102 is substantially disk-shaped. A bottom surface of the rotor 102 contacts with friction contact members 103a and 103b that are arranged on an elliptical vibration generating surface 101a of the vibrator 101. The rotor 102 is rotation driven around the central axis 1000 that is orthogonal to the elliptical vibration generating surface 101a of the vibrator 101.

A structure for coupling the rotor 102 to the vibrator 101 is explained below.

A holder 110 is fixed near a node of the vibrator 101 (piezoelectric element). A shaft 105, the rotor 102, a bearing 107, a spring 108, and a cap ring 109 are arranged in this order between the elliptical vibration generating surface 101a of the vibrator 101 and the holder 110. All these members are concentrically arranged on the central axis 100C.

The bearing 107 is engaged with a central hole 102a of the rotor 102. The shaft 105 passes through the central hole 102a of the rotor 102 and a hole of the bearing 107 along the central axis 100C. A base of the shaft 105 rests on the elliptical vibration generating surface 101a of the vibrator 101.

The shaft 105, which penetrates the central hole 102a of the rotor 102 and the hole of the bearing 107, passes through the spring 108 and a hole of the cap ring 109 in this order, and then passes through a through hole 110a provided in an upper part of the holder 110. A ring 111 is threadably mounted on an upper tip of the shaft 105 that comes out of the through hole 110a. The shaft 105 is thus fixed to the holder 110.

The cap ring 109 and the shaft 105 are provided with threads, and the cap ring 109 is threadably mounted on the shaft 105. A position of the cap ring 109 on the shaft 105, i.e., a pressing force of the spring 108, can be adjusted by rotating the cap ring 109. In other words, a force by which the rotor 102 presses the friction contact members 103a and 103b can be adjusted by rotating the cap ring 109.

How resonance frequencies are matched in the vibrator 101 (piezoelectric element) included in the ultrasonic motor 100 is explained below referring to FIGS. 3A to 3E and FIG. 4.

Figure 3A:
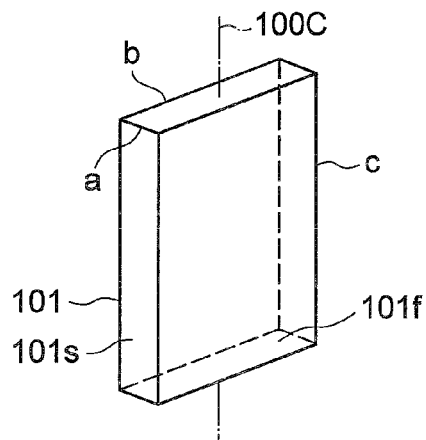
FIG. 3A is a perspective view of a schematic structure of a vibrator according to the first embodiment.
Figure 3B:
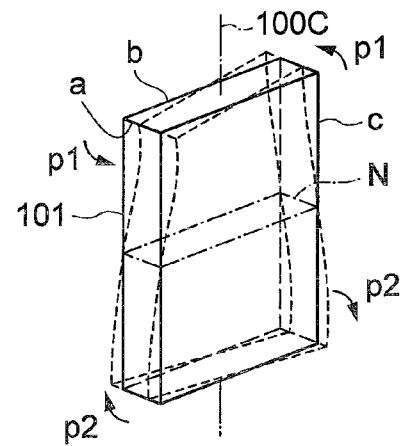
FIG. 3B is a perspective view that depicts with a dotted line a vibration state of the vibrator in a torsional primary vibration mode.

As shown in FIG. 3A, the vibrator 101 has a substantially right-angled parallelepiped shape. A length of a short side 101s of a rectangular cross-section that is orthogonal to the central axis 100C is denoted by a, a length of a long side 101f is denoted by b, and a height of the vibrator 101 along the central axis 100C is denoted by c. In the following explanation, a height direction of the vibrator 101 is assumed to be a direction of vibrations in a longitudinal primary vibration mode as well as an axis direction of torsion in the torsional vibration. Moreover, a, b, and c satisfy a<b<c.

The resonance frequency in the longitudinal primary vibration mode and the resonance frequency in a torsional secondary vibration mode, or the resonance frequency in the longitudinal primary vibration mode and the resonance frequency in a torsional tertiary vibration mode can be matched by appropriately choosing a, b, and c in the vibrator 101.

Figure 3C:
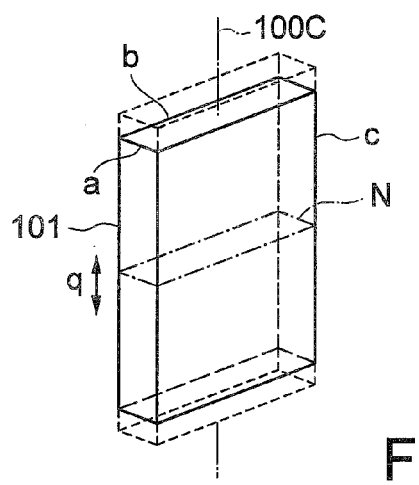
FIG. 3C is a perspective view that depicts with a dotted line a vibration state of the vibrator in a longitudinal primary vibration mode.
Figure 3D:
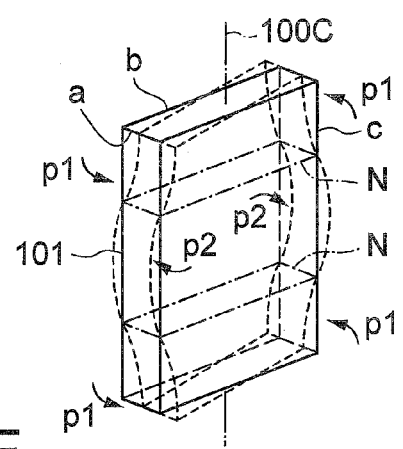
FIG. 3D is a perspective view that depicts with a dotted line a vibration state of the vibrator in a torsional secondary vibration mode.
Figure 3E:
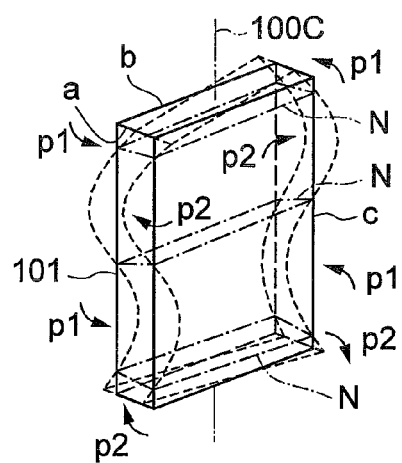
FIG. 3E is a perspective view that depicts with a dotted line a vibration state of the vibrator in a torsional tertiary vibration mode.

In FIGS. 3B to 3E, directions of the torsional vibration are shown by p1 and p2, a direction of the longitudinal vibration is shown by q, and a node of the vibrations is shown by N. One node N is present at central positions in a height direction in each of the torsional primary vibration mode (FIG. 3B) and the longitudinal primary vibration mode (FIG. 3C). Two nodes N are present at two positions in the height direction in the torsional secondary vibration mode (FIG. 3D). Three nodes N are present at three positions in the height direction in the torsional tertiary vibration mode (FIG. 3E).

In FIGS. 3B to 3E, a continuous line is used to show a shape of the vibrator 101 before it is subjected to vibrations and a dotted line is used to show the shape of the vibrator 101 after it is subjected to vibrations.

Figure 4:
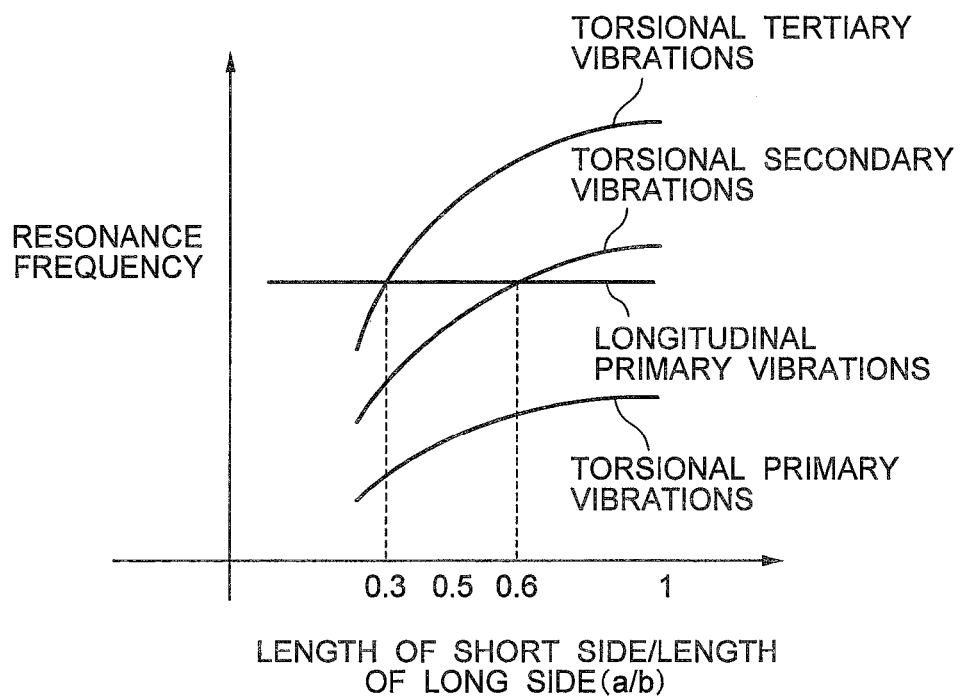
FIG. 4 is a graph that depicts resonance frequencies of each of the modes when a height of the vibrator is fixed and a parameter represented by a length of a short side/a length of a long side is plotted on an axis of abscissa.

As can be seen in FIG. 4, when the parameter a/b is varied, although the resonance frequency of the longitudinal primary vibration mode stays constant without depending on the parameter a/b, the resonance frequencies of the torsional vibration increase with an increase in the parameter a/b.

Furthermore, the resonance frequency of the torsional primary vibration mode never matches with the resonance frequency of the longitudinal primary vibration mode irrespective of the value of the parameter a/b. On the contrary, the resonance frequency of the torsional secondary vibration mode matches with the resonance frequency of the longitudinal primary vibration mode near a position where the parameter a/b is 0.6. Moreover, the resonance frequency of the torsional tertiary vibration mode matches with the resonance frequency of the longitudinal primary vibration mode near a position where the parameter a/b is near 0.3. Therefore, the lengths a and b are chosen in the vibrator 101 according to the first embodiment such that the parameter a/b falls between 0.25 and 0.35 in the longitudinal primary vibration and the torsional tertiary vibration, and falls between 0.5 and 0.6 in the longitudinal primary vibration and the torsional secondary vibration.

In the ultrasonic motor 100, the elliptical vibration is generated by combining the longitudinal primary resonance vibration resulting from an expansion and a contraction of the vibrator 101 along the central axis 100C (rotation axis) and the torsional secondary resonance vibration or a torsional tertiary resonance vibration resulting from twisting of the vibrator 101 around the central axis 100C. A ratio (proportion) of the lengths a and b is chosen such that the resonance frequencies of the longitudinal primary resonance vibration resulting from the expansion and the contraction of the vibrator 101 along the central axis 100C and the torsional secondary resonance vibration or the torsional tertiary resonance vibration resulting from twisting of the vibrator 101 around the central axis 100C almost match.

Figure 5:
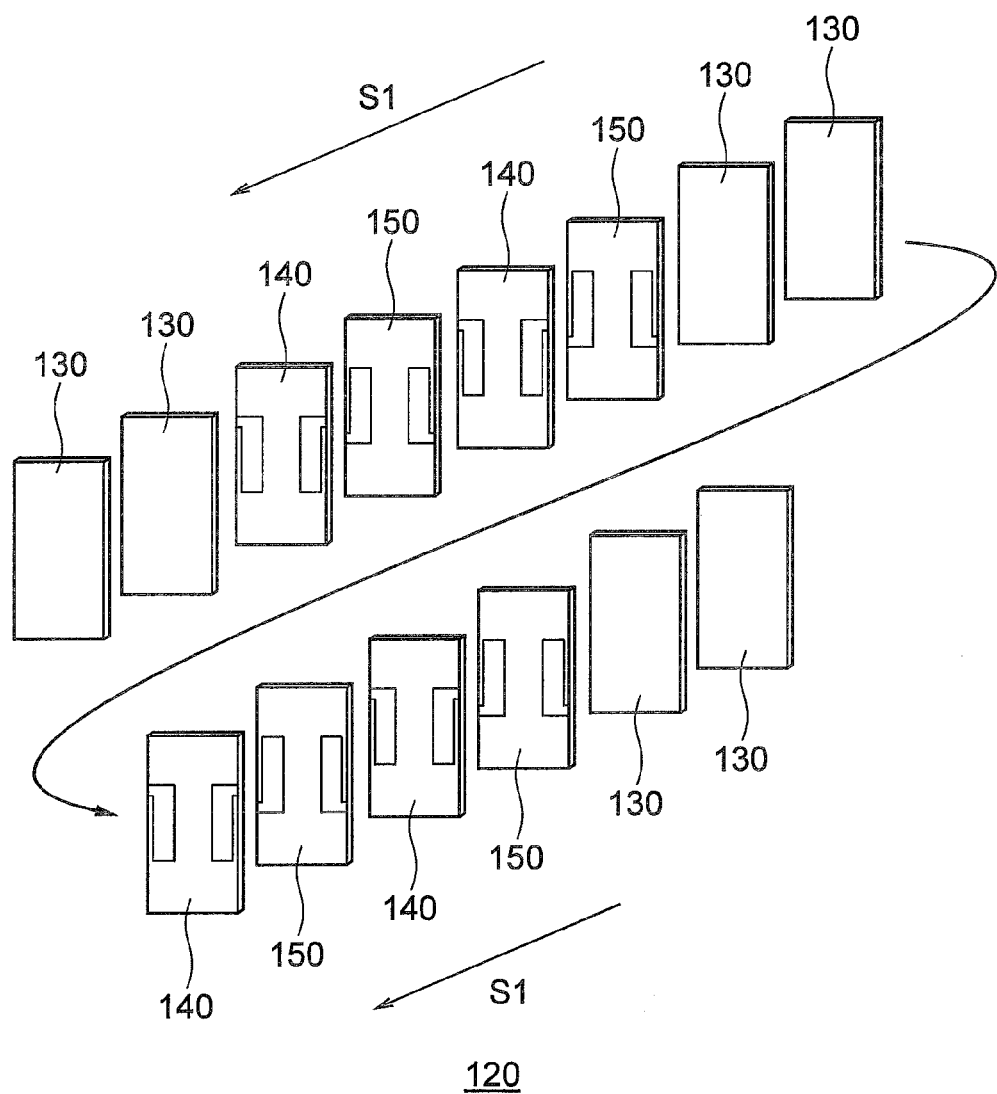
FIG. 5 is an exploded perspective view of a structure of a multilayered piezoelectric element according to the first embodiment.
Figures 6A, 6B, 6C:
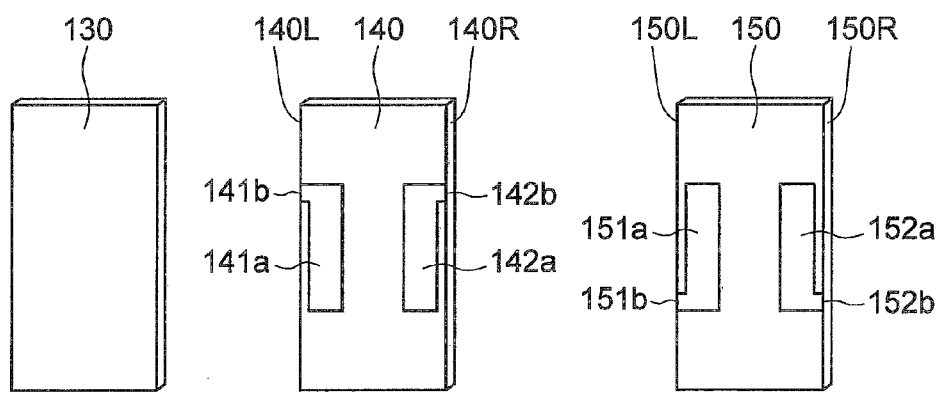
FIG. 6A is a plan view of a structure of a first piezoelectric sheet.
FIG. 6B is a plan view of a structure of a second piezoelectric sheet.
FIG. 6C is a plan view of a structure of a third piezoelectric sheet according to the first embodiment.
Figure 7:
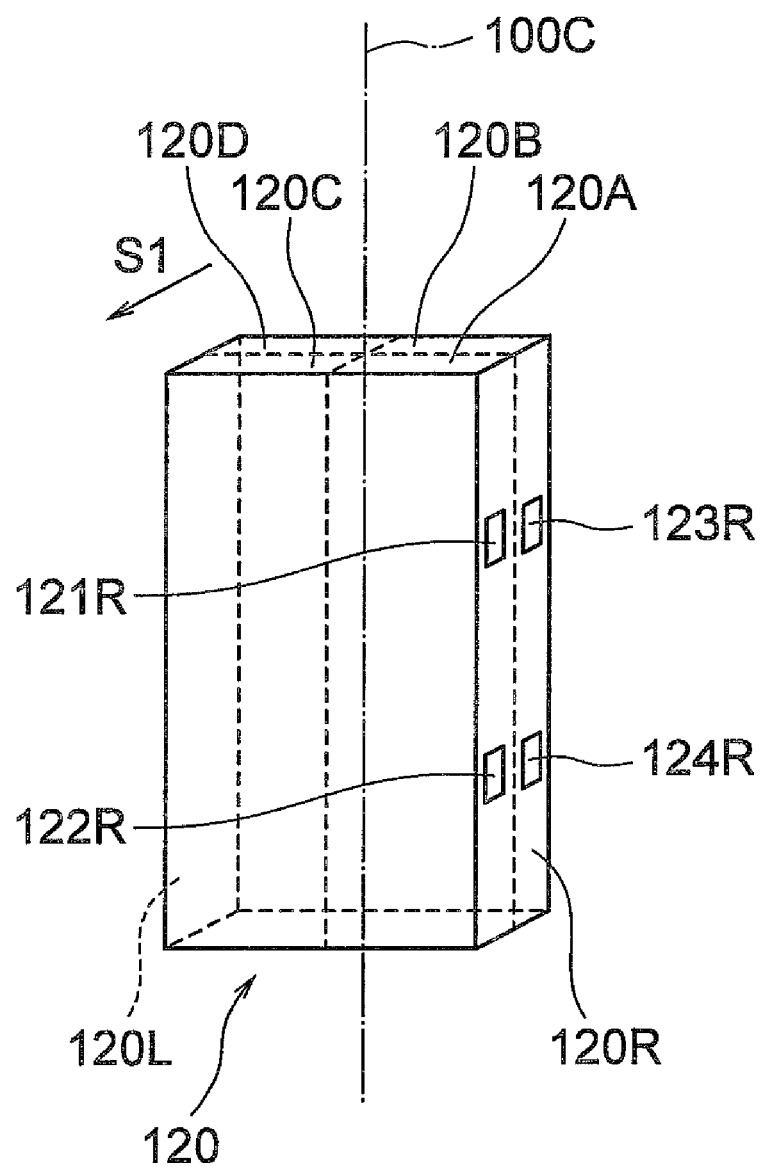
FIG. 7 is a perspective view, from an upper front side, of the multilayered piezoelectric element according to the first embodiment.
Figure 8A:
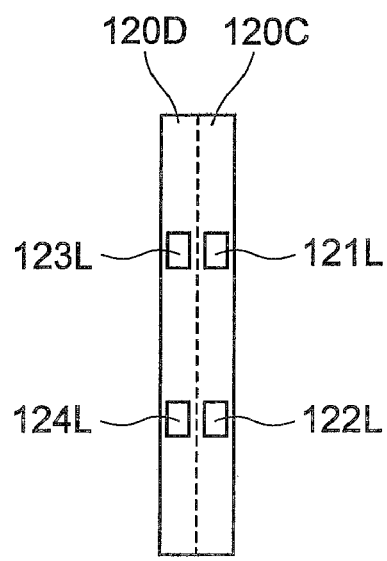
FIG. 8A is a left side view and FIG. 8B is a right side view of the multilayered piezoelectric element shown in FIG. 7.
Figure 8B:
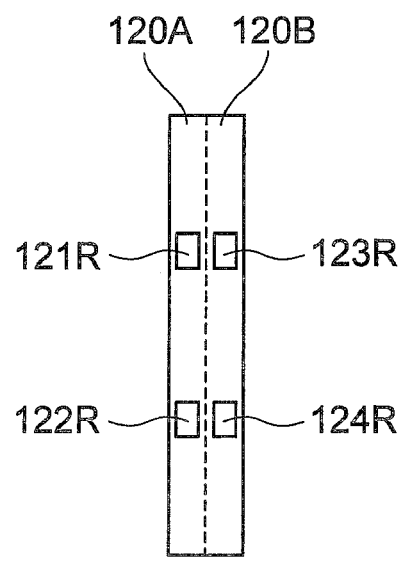

The vibrator 101 includes a multilayered piezoelectric element 120 in which a plurality of piezoelectric sheets is stacked. The longitudinal primary resonance vibration and the torsional secondary resonance vibration or the torsional tertiary resonance vibration are generated in the vibrator 101 because of formation of activation regions by polarization in a thickness direction of the piezoelectric sheets. A structure of the multilayered piezoelectric element 120 forming the vibrator 101 is explained below referring to FIGS. 5 to 8B. FIG. 5 is an exploded perspective view of the structure of the multilayered piezoelectric element 120. FIG. 6A is a plan view of a structure of a first piezoelectric sheet 130, FIG. 6B is a plan view of a structure of a second piezoelectric sheet 140, and FIG. 6C is a plan view of a structure of a third piezoelectric sheet 150. FIG. 7 is a perspective view from an upper front side of the multilayered piezoelectric element 120. FIG. 8A is a left side view of the multilayered piezoelectric element 120 shown in FIG. 7, and FIG. 8B is a right side view of the multilayered piezoelectric element 120 shown in FIG. 7.

As shown in FIG. 5, the multilayered piezoelectric element 120 includes, stacked from this side to the other side in the thickness direction (a direction indicated by an arrow S1 in FIG. 5), two first piezoelectric sheets 130, two pairs of the second piezoelectric sheets 140 and the third piezoelectric sheets 150 alternately layered, two first piezoelectric sheets 130, two pairs of the second piezoelectric sheets 140 and the third piezoelectric sheets 150 alternately layered, and two first piezoelectric sheets 130.

The number and arrangement of the piezoelectric sheets included in the multilayered piezoelectric element 120 can be varied depending on the specification of the vibrator 101.

As shown in FIGS. 6A to 6C, the first piezoelectric sheet 130, the second piezoelectric sheet 140, and the third piezoelectric sheet 150 have an identical shape of a rectangular plate. As the first piezoelectric sheet 130, the second piezoelectric sheet 140, and the third piezoelectric sheet 150, for example, hard-type lead zirconate titanate piezoelectric elements are used. The piezoelectric element consisting of the second piezoelectric sheet 140 and the third piezoelectric sheet 150 includes an internal electrode and an activated area polarized in the thickness direction.

Two internal electrodes are formed by way of printing on an upper surface of each second piezoelectric sheet 140. Two internal electrodes are formed by way of printing also on a surface of each of the third piezoelectric sheet 150.

Concrete structures of the internal electrodes and external electrodes are explained below.

As shown in FIG. 6B, around centers of long sides (vertical sides in FIGS. 6A to 6C) of the second piezoelectric sheet 140, a first internal electrode 141a of +phase and a second internal electrode 142a of +phase are arranged facing to and isolated from each other.

The first internal electrode 141a of +phase and the second internal electrode 142a of +phase are extended such that their protrusions 141b and 142b are exposed to an upper part of long sides 140L and 140R of the second piezoelectric sheet 140. Moreover, the protrusions 141b and 142b are arranged at a position facing to each other along the long sides of the second piezoelectric sheet 140.

As shown in FIG. 6C, a first internal electrode 151a of −phase and a second internal electrode 152a of −phase are arranged around a center of long sides of the third piezoelectric sheet 150 facing to and isolated from each other.

The first internal electrode 151a of −phase and the second internal electrode 152a of −phase are extended such that their protrusions 151b and 152b are respectively exposed to a lower part of long sides 150L and 150R of the third piezoelectric sheet 150. Moreover, the protrusions 151b and 152b are also arranged at a position facing to and isolated from each other along the long sides of the third piezoelectric sheet 150.

The first internal electrode 141a of +phase and the first internal electrode 151a of −phase are formed on the position facing to each other when the second piezoelectric sheet 140 and the third piezoelectric sheet 150 are stacked. Moreover, the second internal electrode 142a of +phase and the second internal electrode 152a of −phase are formed on the position facing to each other when the second piezoelectric sheet 140 and the third piezoelectric sheet 150 are stacked.

The external electrodes are formed on the protrusions 141b, 142b, 151b, and 152b of internal electrodes, for example, by way of printing of silver paste.

The external electrodes formed on the protrusions 141b compose a first external electrode group 121L of +phase and a third external electrode group 123L of +phase on a left surface 120L of the multilayered piezoelectric element 120. The external electrodes formed on the protrusions 142b compose a first external electrode group 121R of +phase and a third external electrode group 123R of +phase on a right surface 120R of the multilayered piezoelectric element 120 (FIG. 7 and FIGS. 8A to 8B).

The external electrodes formed on the protrusions 151b compose a second external electrode group 122L of −phase and a fourth external electrode group 124L of −phase on the left surface 120L of the multilayered piezoelectric element 120. The external electrodes formed on the protrusion 152b compose a second external electrode group 122R of −phase and a fourth external electrode group 124R of −phase on the right surface 120R of the multilayered piezoelectric element 120 (FIG. 7 and FIGS. 8A to 8B). Meanwhile, the external electrodes are not shown in FIGS. 1 and 2.

The external electrodes are respectively connected to an external power supply (not shown) of the ultrasonic motor 100. As an example, an FPC (flexible print circuit) is used for connection and one end of the FPC is connected to each electrode group.

Eight external electrodes formed on the surfaces of the multilayered piezoelectric element 120 compose four pairs of phases by respectively coupling the first external electrode group 121L of +phase and the second external electrode group 122L of −phase as a pair, the third external electrode group 123L of +phase and the fourth external electrode group 124L of −phase as a pair, the first external electrode group 121R of +phase and the second external electrode group 122R of −phase as a pair, and the third external electrode group 123R of +phase and the fourth external electrode group 124R of −phase as a pair.

From another aspect, the multilayered piezoelectric element 120 consists of four regions 120A, 120B, 120C, and 120D with an angle of 90 degrees for each, separated by orthogonal surfaces around the central axis 100C (FIG. 7 and FIGS. 8A to 8B).

The region 120A corresponds to the phases of the first external electrode group 121R of +phase and the second external electrode group 122R of −phase, the region 120B corresponds to the phases of the third external electrode group 123R of +phase and the fourth external electrode group 124R of −phase, the region 120O corresponds to the phases of the first external electrode group 121L of +phase and the second external electrode group 122L of −phase, and the region 120D corresponds to the phases of the third external electrode group 123L of +phase and the fourth external electrode group 124L of −phase, respectively. By this structure, each region is deformed to a single direction in response to a signal applied from the external power supply.

Figure 9:
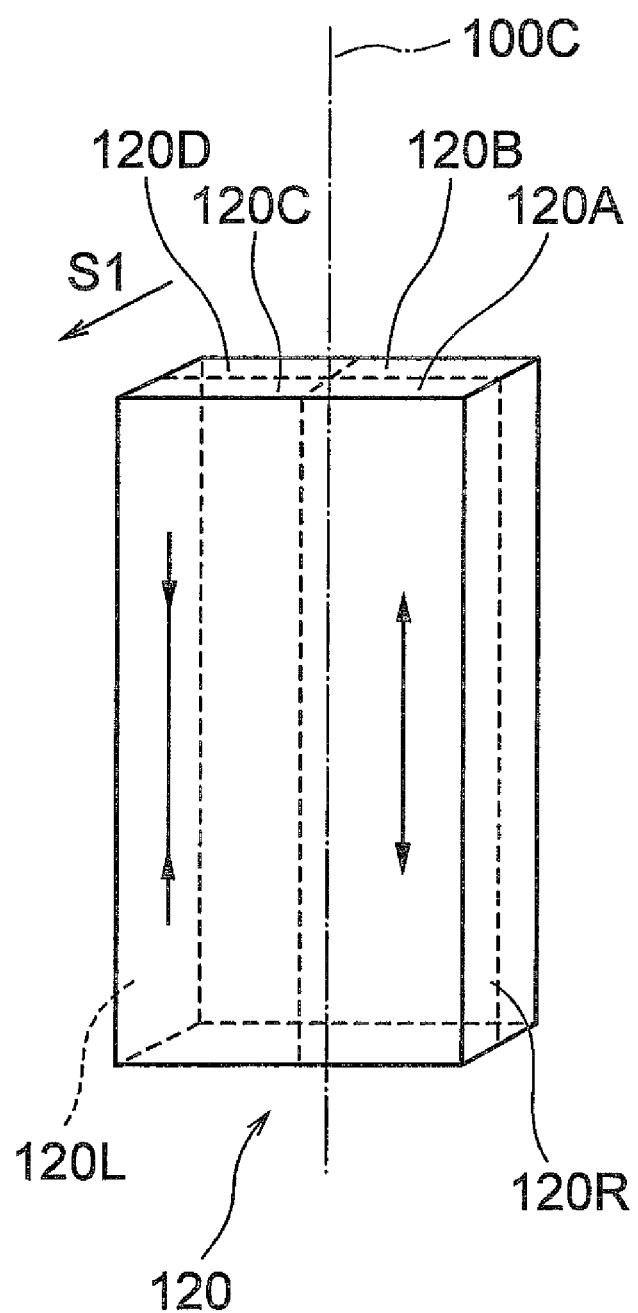
FIG. 9 is a perspective view from the upper front side of the multilayered piezoelectric element of the first embodiment that shows a deformation in each area of the multilayered piezoelectric element.
Figures 10A, 10B, 10C, 10D:
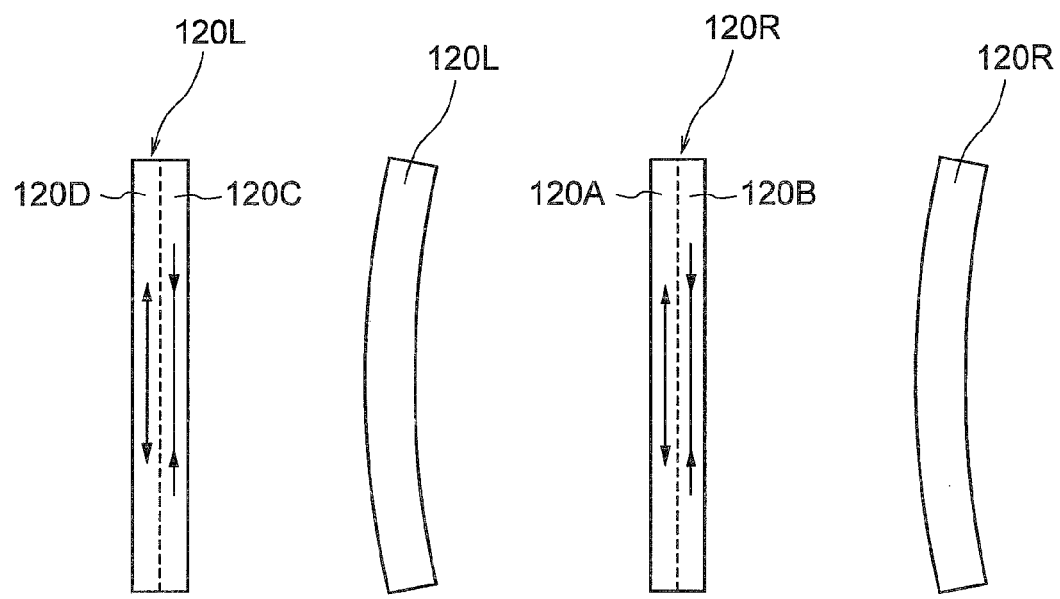
FIG. 10A is a left side view of the multilayered piezoelectric element shown in FIG. 9.
FIG. 10B is a left side view of the deformation of the multilayered piezoelectric element shown in FIG. 9.
FIG. 10C is a right side view of the multilayered piezoelectric element shown in FIG. 9.
FIG. 10D is a right side view of the deformation of the multilayered piezoelectric element shown in FIG. 9.

An operation of the vibrator 101 and the multilayered piezoelectric element 120 is explained below referring to FIG. 9 and FIGS. 10A to 10D. FIG. 9 is a figure that shows the deformation of each region of the multilayered piezoelectric element 120 and it is an exploded view from an upper front side. FIG. 10A is a left side view of the multilayered piezoelectric element 120 shown in FIG. 9, FIG. 10B is a left side view of the deformation of the multilayered piezoelectric element 120 shown in FIG. 9, FIG. 10C is a right side view of the multilayered piezoelectric element 120 shown in FIG. 9, and FIG. 10D is a right side view of the deformation of the multilayered piezoelectric element 120 shown in FIG. 9. The external electrodes are not shown in FIG. 9 and FIGS. 10A to 10D.

In the examples shown in FIG. 9 and FIGS. 10A to 10D, a signal is applied from the external power supply to each phase between the first external electrode group 121R and the second external electrode group 122R, between the third external electrode group 123R and the fourth external electrode group 124R, between the first external electrode group 121L and the second external electrode group 122L, and between the third external electrode group 123L and the fourth external electrode group 124L, respectively. By this application of power, the regions 120A and 120D are deformed so that they are expanded along the central axis 100C, and the regions 120B and 120C are deformed so that they are contracted along the central axis 100C. That is, the adjacent regions of the multilayered piezoelectric element 120 are deformed along the central axis 100C to the opposite directions and the directions of deformation are vertical to a direction of polarization (direction S1 of stacking). Meanwhile, the directions of deformation of the regions can be different from the directions shown in FIG. 9 and FIGS. 10A to 10D as far as the directions of deformation of the adjacent regions are opposite from each other.

As shown here, when four regions are deformed, by combining the longitudinal primary resonance vibration (FIG. 3C) and the torsional secondary resonance vibration (FIG. 3D) along the central axis 100C, the elliptical vibration is generated on both sides of the height direction of the vibrator 101. Accordingly, elliptical vibration is propagated to the rotor 102 through the friction contact members 103a and 103b. In addition, a torsional secondary resonance vibration to the opposite direction can be generated by applying signals to each phase so that each region is deformed to the directions opposite to the directions shown above.

With the structure explained above, the vibrator 101 that consists of a single part of a simple structure without a groove etc., can be obtained. The cost of the ultrasonic motor 100 that includes this vibrator 101 can be reduced because it requires only a small number of parts and can be easily assembled. Furthermore, the ultrasonic motor 100 can easily generate the longitudinal vibration and the torsional vibration, and rotate the rotor 102 using the elliptical vibration by combining the longitudinal vibration and the torsional vibration.

Second Embodiment

An ultrasonic motor according to the second embodiment of the present invention differs from the ultrasonic motor 100 according to the first embodiment in the point that an elliptical vibration is generated by combining a longitudinal primary resonance vibration and a torsional tertiary resonance vibration. Structures are the same as those of the first embodiment excepting the piezoelectric sheets and accordingly, the same reference symbols will be used and the descriptions of the items other than the piezoelectric sheets are not shown.

Figure 11:
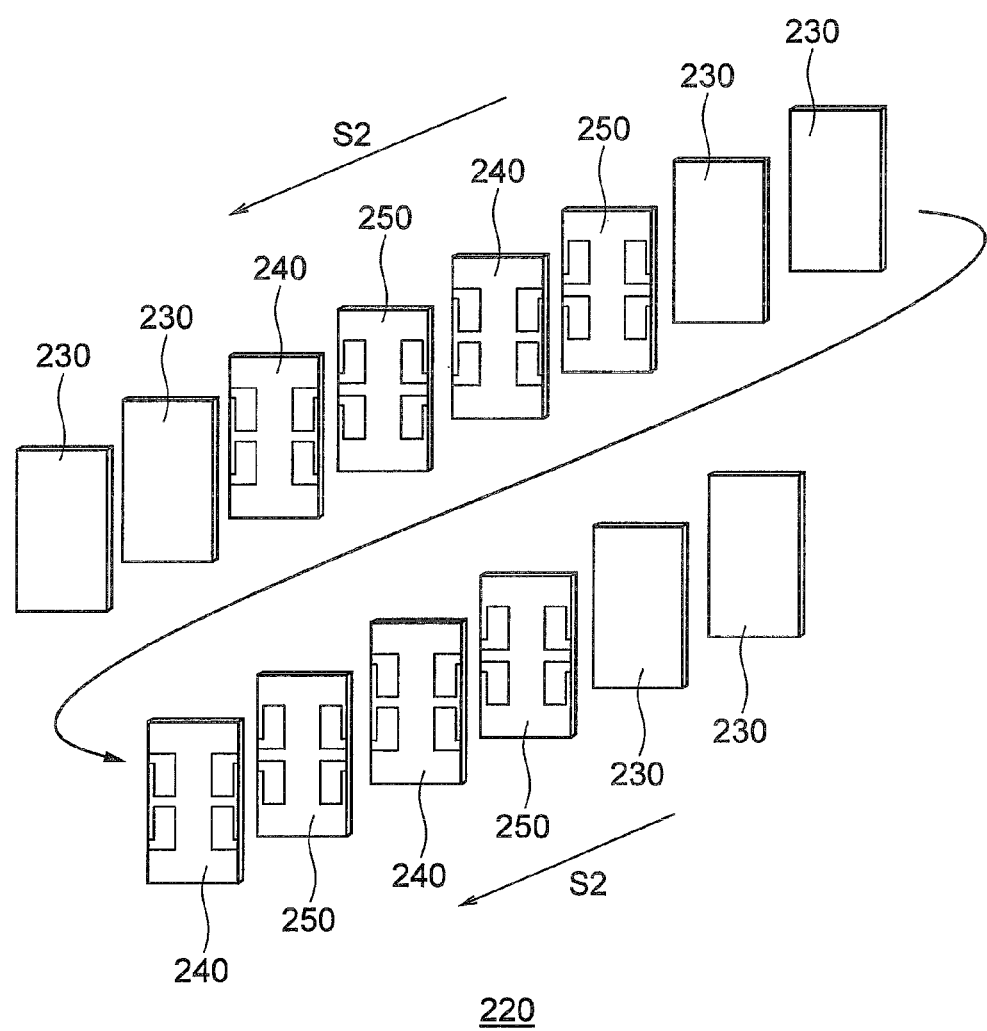
FIG. 11 is an exploded perspective view of a structure of a multilayered piezoelectric element according to a second embodiment.
Figures 12A, 12B, 12C:
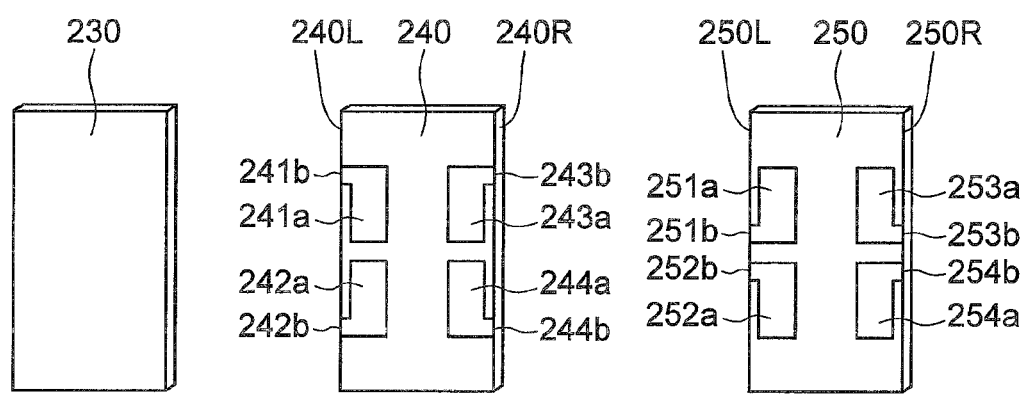
FIG. 12A is a plan view of a structure of a first piezoelectric sheet.
FIG. 12B is a plan view of a structure of a second piezoelectric sheet.
FIG. 12C is a plan view of a structure of a third piezoelectric sheet according to the second embodiment.
Figure 13:
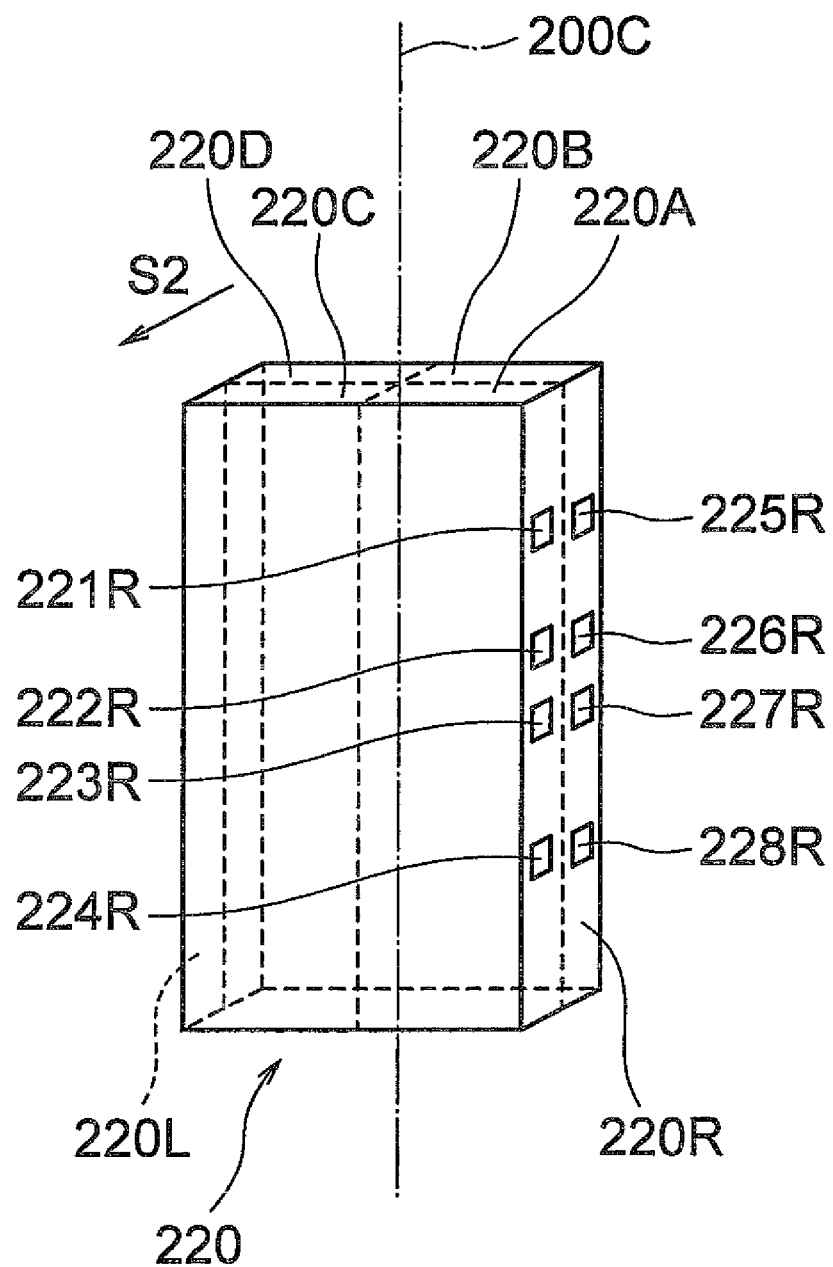
FIG. 13 is a perspective view from an upper front side of the multilayered piezoelectric element according to the second embodiment.
Figure 14A:
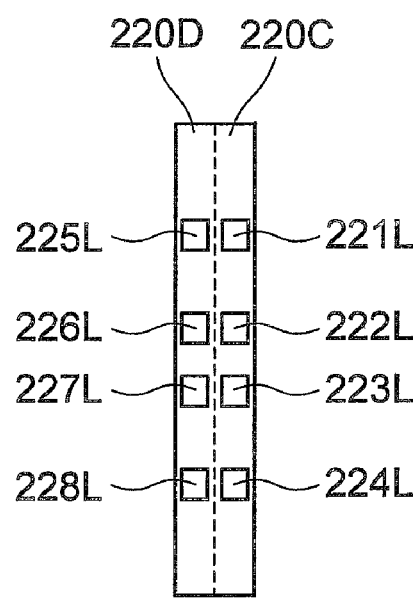
FIG. 14A is a left side view of the multilayered piezoelectric element shown in FIG. 13.
Figure 14B:
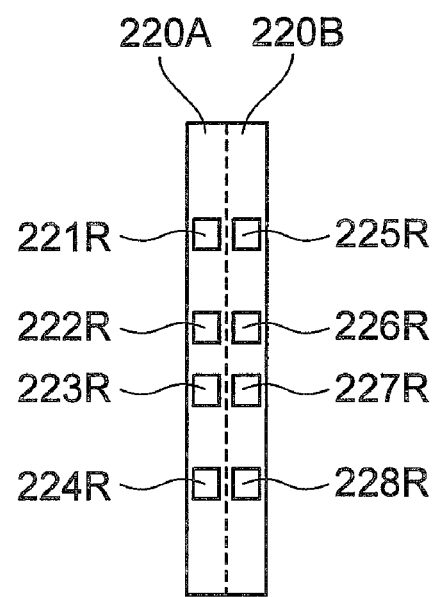
FIG. 14B is a right side view of the multilayered piezoelectric element shown in FIG. 13.

A vibrator in the second embodiment includes a multilayered piezoelectric element 220 formed by a plurality of piezoelectric sheets stacked together and that generates the longitudinal primary resonance vibration and the torsional tertiary resonance vibration by an activated area polarized in a thickness direction of the piezoelectric sheets. A structure of the multilayered piezoelectric element 220 forming the vibrator is explained below using FIGS. 11 to 14B. FIG. 11 is an exploded perspective view of the structure of the multilayered piezoelectric element 220. FIG. 12A is a plan view of a structure of a first piezoelectric sheet 230. FIG. 12B is a plan view of a structure of a second piezoelectric sheet 240. FIG. 12C is a plan view of a structure of a third piezoelectric sheet 250. FIG. 13 is a perspective view from an upper front side of the multilayered piezoelectric element 220. FIG. 14A is a left side view of the multilayered piezoelectric element 220 shown in FIG. 13. FIG. 14B is a right side view of the multilayered piezoelectric element 220 shown in FIG. 13.

As shown in FIG. 11, the multilayered piezoelectric element 220 includes, stacked from this side to the other side in the thickness direction (a direction indicated by an arrow S2 in FIG. 11), two first piezoelectric sheets 230, two pairs of the second piezoelectric sheets 240 and the third piezoelectric sheets 250 alternately layered, two first piezoelectric sheets 230, two pairs of the second piezoelectric sheets 240 and the third piezoelectric sheets 250 alternately layered, and two first piezoelectric sheets 230.

As shown in FIGS. 12A to 12C, the first piezoelectric sheet 230, the second piezoelectric sheet 240, and the third piezoelectric sheet 250 have an identical shape of a rectangular plate. As the first piezoelectric sheet 230, the second piezoelectric sheet 240, and the third piezoelectric sheet 250, for example, hard-type lead zirconate titanate piezoelectric elements are used. The piezoelectric element consisting of the second piezoelectric sheet 240 and the third piezoelectric sheet 250 includes an internal electrode and an activated area polarized in the thickness direction.

The concrete structures of the internal electrode and an external electrode are explained below.

As shown in FIG. 12B, a first internal electrode 241a of +phase, a second internal electrode 242a of +phase, a third internal electrode 243a of +phase, and a fourth internal electrode 244a of +phase are formed on the second piezoelectric sheet 240. The first internal electrode 241a of +phase and the third internal electrode 243a of +phase are placed at a top position, facing to and isolated from each other along long sides (vertical direction in FIGS. 12A to 12C) of the second piezoelectric sheet 240. The second internal electrode 242a of +phase and the fourth internal electrode 244a of +phase are arranged at a bottom position, facing to and isolated from each other along the long sides of the second piezoelectric sheet 240.

The first internal electrode 241a of +phase and the third internal electrode 243a of +phase are extended so that their protrusions 241b and 243b are respectively exposed to an upper part of long sides 240L and 240R of the second piezoelectric sheet 240. The second internal electrode 242a of +phase and the fourth internal electrode 244a of +phase are extended so that their protrusions 242b and 244b are respectively exposed to a lower part of the long sides 240L and 240R of the second piezoelectric sheet 240. The protrusions 241b and 243b are arranged at positions facing to each other along the long side of the second piezoelectric sheet 240. The protrusions 242b and 244b are also arranged at positions facing to each other.

Similarly, as shown in FIG. 12C, a first internal electrode 251a of −phase, a second internal electrode 252a of −phase, a third internal electrode 253a of −phase, and a fourth internal electrode 254a of −phase are formed on the third piezoelectric sheet 250. The first internal electrode 251a of −phase and the third internal electrode 253a of −phase are placed at the top position mutually facing to and isolated from each other along the long sides of the third piezoelectric sheet 250. The second internal electrode 252a of −phase and the fourth internal electrode 254a of −phase are arranged at the bottom position facing to and isolated from each other along the long sides of the third piezoelectric sheet 250.

The first internal electrode 251a of −phase and the third internal electrode 253a of −phase are extended such that their protrusions 251b and 253b are respectively exposed to an upper part of long sides 250L and 250R of the third piezoelectric sheet 250. The second internal electrode 252a of −phase and the fourth internal electrode 254a of −phase are extended so that their protrusions 252b and 254b are respectively exposed to a lower part of the long sides 250L and 250R of the third piezoelectric sheet 250. The protrusions 251b and 253b are arranged at the positions facing to each other along the long side of the third piezoelectric sheet 250. The protrusions 252b and 254b are also arranged at the positions facing to each other.

The first internal electrode 241a of +phase and the first internal electrode 251a of −phase, the second internal electrode 242a of +phase and the second internal electrode 252a of −phase, the third internal electrode 243a of +phase and the third internal electrode 253a of −phase, and the fourth internal electrode 244a of +phase and the fourth internal electrode 254a of −phase, are respectively formed on a position facing to each other when the second piezoelectric sheet 240 and the third piezoelectric sheet 250 are stacked.

The external electrodes are formed on the protrusions 241b, 242b, 243b, 244b, 251b, 252b, 253b, and 254b of the internal electrodes, for example, by way of printing of silver paste.

The external electrodes formed on the protrusion 241b compose a first external electrode group 221L of +phase and a fifth external electrode group 225L of +phase on a left surface 220L of the multilayered piezoelectric element 220. The external electrodes formed on the protrusion 242b compose a fourth external electrode group 224L of +phase and an eighth external electrode group 228L of +phase on the left surface 220L of the multilayered piezoelectric element 220.

Moreover, the external electrodes formed on the protrusion 243b compose a first external electrode group 221R of +phase and a fifth external electrode group 225R of +phase on a right surface 220R of the multilayered piezoelectric element 220. The external electrodes formed on the protrusion 244b compose a fourth external electrode group 224R of +phase and an eighth external electrode group 228R of +phase on the right surface 220R of the multilayered piezoelectric element 220 (FIG. 13 and FIGS. 14A to 14B).

The external electrodes formed on the protrusion 251b compose a second external electrode group 222L of −phase and a sixth external electrode group 226L of −phase on the left surface 220L of the multilayered piezoelectric element 220. The external electrodes formed on the protrusion 252b compose a third external electrode group 223L of −phase and a seventh external electrode group 227L of −phase on the left surface 220L of the multilayered piezoelectric element 220.

Moreover, the external electrodes formed on the protrusion 253b compose a second external electrode group 222R of −phase and a sixth external electrode group 226R of −phase on the right surface 220R of the multilayered piezoelectric element 220. The external electrodes formed on the protrusion 254b compose a third external electrode group 223R of −phase and a seventh external electrode group 227R of −phase on the right surface 220R of the multilayered piezoelectric element 220 (FIG. 13 and FIGS. 14A to 14B).

Sixteen external electrodes formed on the multilayered piezoelectric element 220 are coupled into four pairs of phases on each of the left surface 220L and the right surface 220R of the multilayered piezoelectric element 220. In the concrete, the first external electrode group 221L of +phase and the second external electrode group 222L of −phase as a pair, the third external electrode group 223L of −phase and the fourth external electrode group 224L of +phase as a pair, the fifth external electrode group 225L of +phase and the sixth external electrode group 226L of −phase as a pair, and the seventh external electrode group 227L of −phase and the eighth external electrode group 228L of +phase as a pair, respectively, compose the four pairs of phases on the left surface 220L of the multilayered piezoelectric element 220. The first external electrode group 221R of +phase and the second external electrode group 222R of −phase as a pair, the third external electrode group 223R of phase and the fourth external electrode group 224R of +phase as a pair, the fifth external electrode group 225R of +phase and the sixth external electrode group 226R of −phase as a pair, and the seventh external electrode group 227R of −phase and the eighth external electrode group 228R of +phase as a pair, respectively, compose the four pairs of phases on the right surface 220R of the multilayered piezoelectric element 220.

From another aspect, the multilayered piezoelectric element 220 consists of four regions 220A, 220B, 220C, and 220D with an angle of 90 degrees for each, separated by orthogonal surfaces around a central axis 200C (FIG. 13 and FIGS. 14A to 14B).

The region 220A corresponds to the pairs of the first external electrode group 221R of +phase and the second external electrode group 222R of −phase, and the pairs of the third external electrode group 223R of −phase and the fourth external electrode group 224R of +phase. The region 220B corresponds to the pairs of the fifth external electrode group 225R of +phase and the sixth external electrode group 226R of −phase, and the pairs of the seventh external electrode group 227R of −phase and the eighth external electrode group 228R of +phase. The region 220C corresponds to the pairs of the first external electrode group 221L of +phase and the second external electrode group 222L of −phase, and the pairs of the third external electrode group 223L of −phase and the fourth external electrode group 224L of +phase. The region 220D corresponds to the pairs of the fifth external electrode group 225L of +phase and the sixth external electrode group 226L of −phase, and the pairs of the seventh external electrode group 227L of −phase and the eighth external electrode group 228L of +phase.

By this structure, each part is deformed reacting to a signal when the signal is applied to each phase from the external power supply. Since each region includes two pairs of phases, a part corresponding to each phase can be deformed to different directions even in the same region.

Figure 15:
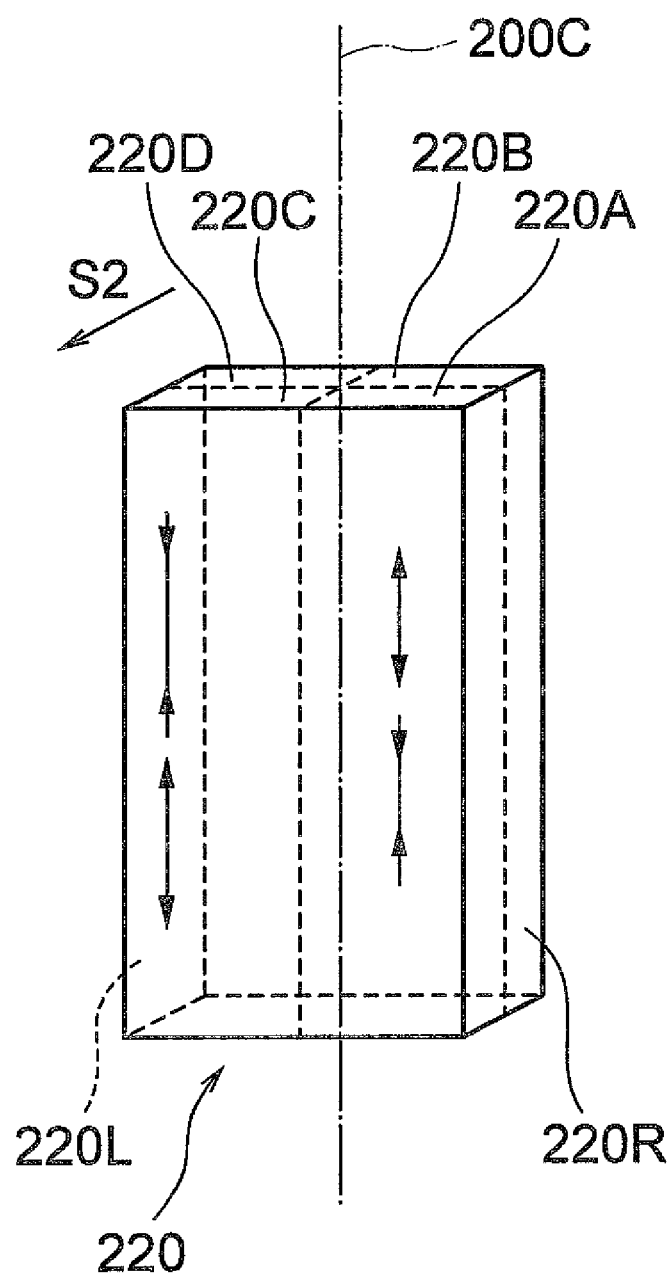
FIG. 15 is a perspective view from the upper front side of the multilayered piezoelectric element of the second embodiment that shows a deformation in each area of the multilayered piezoelectric element.
Figures 16A, 16B, 16C, 16D:
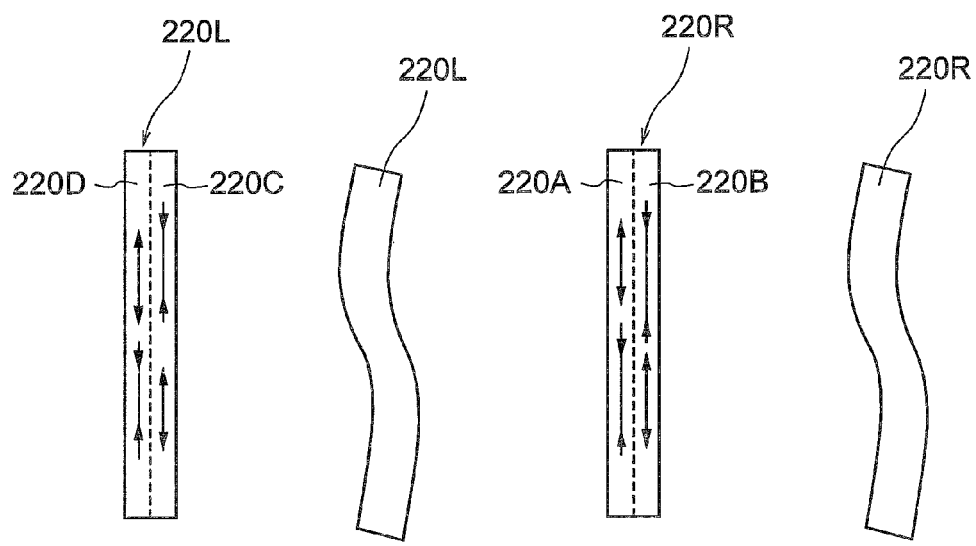
FIG. 16A is a left side view of the multilayered piezoelectric element shown in FIG. 15.
FIG. 16B is a left side view of the deformation of the multilayered piezoelectric element shown in FIG. 15.
FIG. 16C is a right side view of the multilayered piezoelectric element shown in FIG. 15.
FIG. 16D is a right side view of the deformation of the multilayered piezoelectric element shown in FIG. 15.

An operation of the vibrator 101 and the multilayered piezoelectric element 220 is explained below referring to FIG. 15 and FIGS. 16A to 16D. FIG. 15 shows deformations of each region of the multilayered piezoelectric element 220 and it is a view from the upper front side. FIG. 16A is a left side view of the multilayered piezoelectric element 220 shown in FIG. 15. FIG. 16B is a left side view of the deformation of the multilayered piezoelectric element 220 shown in FIG. 15. FIG. 16C is a right side view of the multilayered piezoelectric element 220 shown in FIG. 15. FIG. 16D is a right side view of the deformation of the multilayered piezoelectric element 220 shown in FIG. 15. The external power supply is not shown in FIG. 15 and FIGS. 16A to 16D.

In the examples shown in FIG. 15 and FIGS. 16A to 16D, a signal is respectively applied to the pairs of the external electrode groups of each region from the external power supply. As the effect, in the region 220A, the deformation occurs so that, a section facing to the first external electrode group 221R and the second external electrode group 222R expands to a direction along the central axis 200C, and a portion facing to the third external electrode group 223R and the fourth external electrode group 224R contracts to the direction along the central axis 200C. Likewise, in the region 220B, deformation occurs so that, a section facing to the fifth external electrode group 225R and the sixth external electrode group 226R contracts to the direction along the central axis 200C, and a section facing to the seventh external electrode group 227R and the eighth external electrode group 228R expands to the direction along the central axis 200C. Moreover, in the region 220C, deformation occurs so that, a section facing to the first external electrode group 221L and the second external electrode group 222L contracts to the direction along the central axis 200C, and a section facing to the third external electrode group 223L and the fourth external electrode group 224L expands to the direction along the central axis 200C. Likewise, in the region 220D, deformation occurs so that, a section facing to the fifth external electrode group 225L and the sixth external electrode group 226L expands to the direction along the central axis 200C, and a section facing to the seventh external electrode group 227L and the eighth external electrode group 228L contracts to the direction along the central axis 200C.

Accordingly, the multilayered piezoelectric element 220 deforms to the direction along the central axis 200C so that the adjacent regions or the adjacent portions deform to opposite directions and the directions of deformations are vertical to a direction of polarization (direction S2 of stacking). Meanwhile, the directions of deformations of each region can differ from those shown in FIG. 15 and FIGS. 16A to 16D as far as the directions of deformations of the adjacent regions are opposite.

As explained above, by deforming the four regions, the elliptical vibration is generated on both surfaces of the height direction of the vibrator 101 by combining the longitudinal primary resonance vibration (FIG. 3C) and the torsional tertiary resonance vibration (FIG. 3E) around the central axis 200C as an axis of twisting. Accordingly, the elliptical vibration is transmitted to the rotor 102 through the friction contact members 103a and 103b. Likewise, the torsional tertiary vibration to an opposite direction can be generated by applying a signal so that each portion of each region will deform to the opposite direction.

With the structure mentioned above, the vibrator 101 that consists of a single part of a simple structure without a groove etc., can be obtained. The cost of the ultrasonic motor 100 that includes this vibrator 101 can be reduced because it requires only a small number of parts and can be easily assembled. Furthermore, the ultrasonic motor 100 can easily generate the longitudinal vibration and the torsional vibration, and rotate the rotor 102 using the elliptical vibration by combining these vibrations.

Furthermore, other structures, operations, and advantages are the same as those of the first embodiment.

Third Embodiment

An ultrasonic motor according to the third embodiment of the present invention generates an elliptical vibration by combining a longitudinal primary resonance vibration and a torsional secondary resonance vibration. It differs from the ultrasonic motor 100 according to the first embodiment in the point that it includes an internal electrode pattern that enables an external electrode group to be arranged on a bottom surface of a multilayered piezoelectric element 320. Other structures are the same as those of the ultrasonic motor 100 of the first embodiment and accordingly, the same reference symbols will be used and the descriptions of the items other than those of the piezoelectric sheets are not shown in the diagrams.

Figure 17:
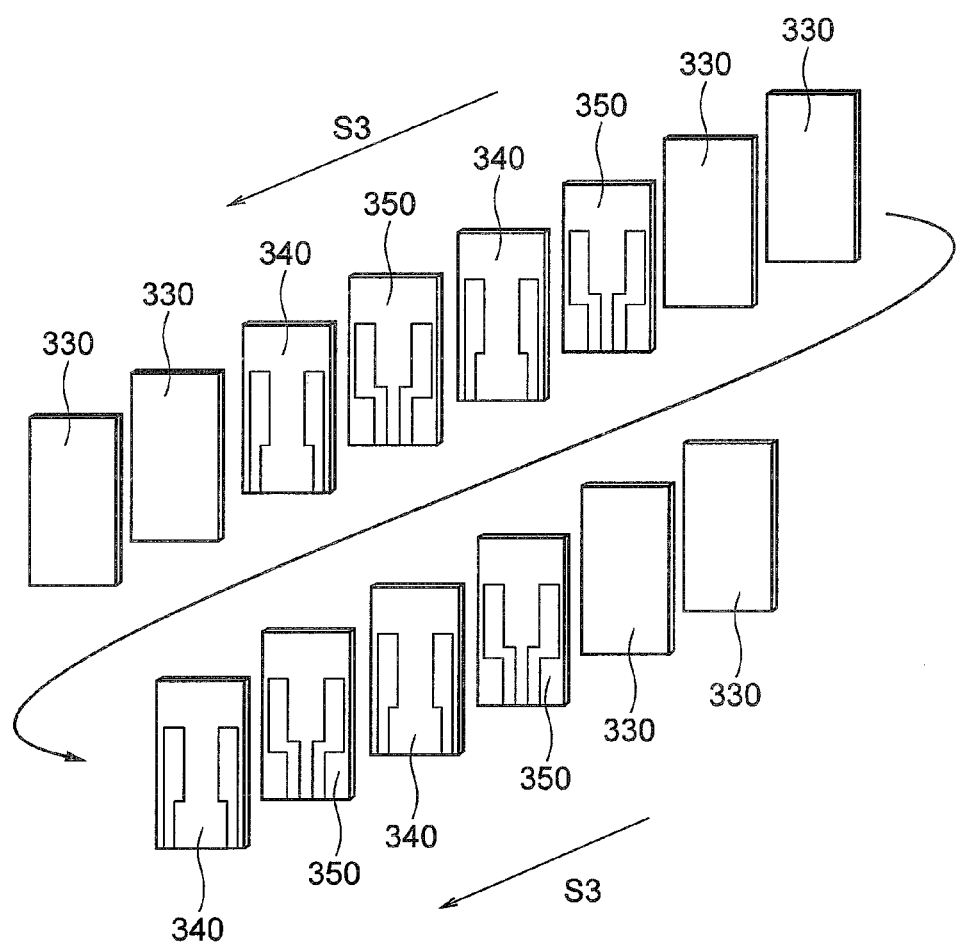
FIG. 17 is an exploded perspective view of a structure of a multilayered piezoelectric element according to a third embodiment.
Figures 18A, 18B, 18C:
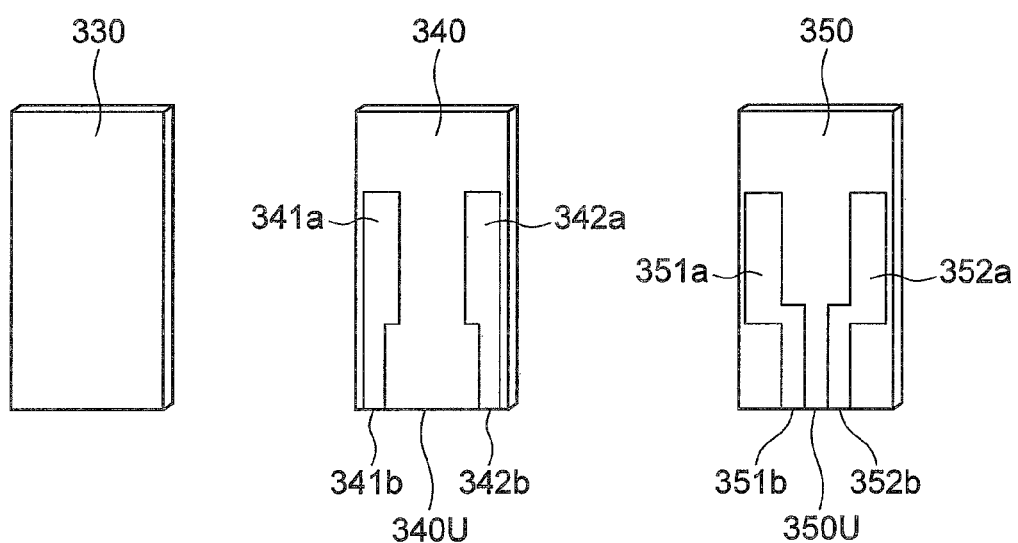
FIG. 18A is a plan view of a structure of a first piezoelectric sheet.
FIG. 18B is a plan view of a structure of a second piezoelectric sheet.
FIG. 18C is a plan view of a structure of a third piezoelectric sheet according to the third embodiment.
Figure 19:
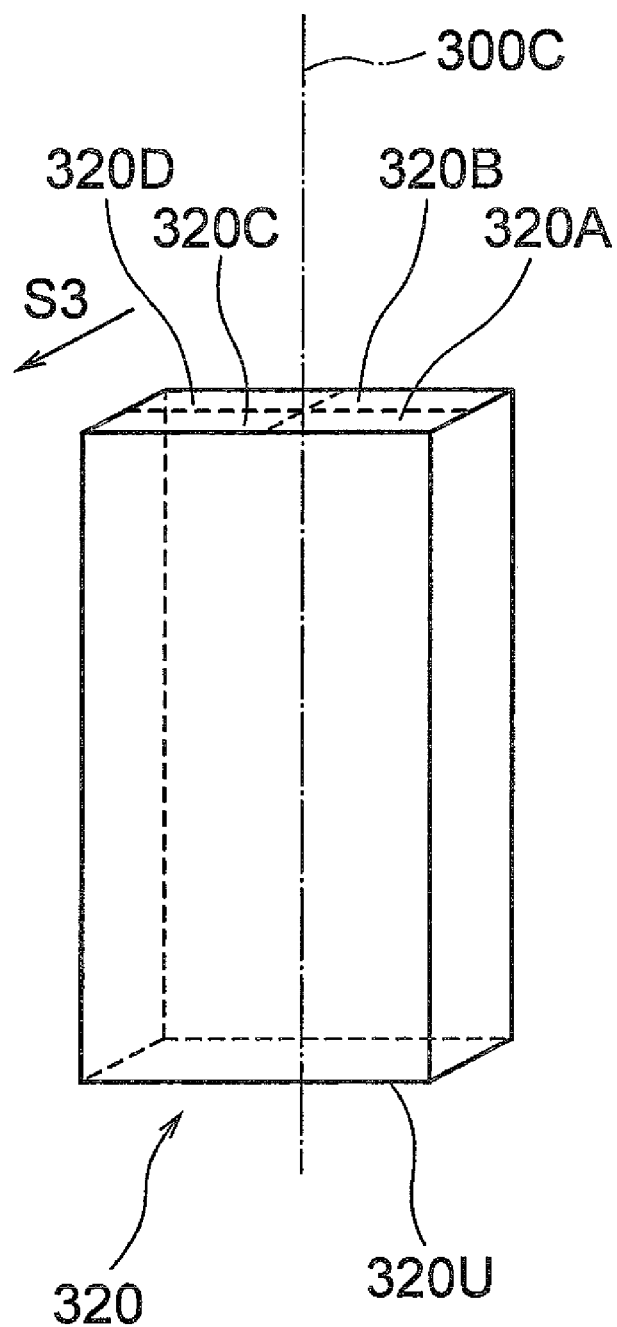
FIG. 19 is a perspective view from an upper front side of the multilayered piezoelectric element according to the third embodiment.
Figure 20:
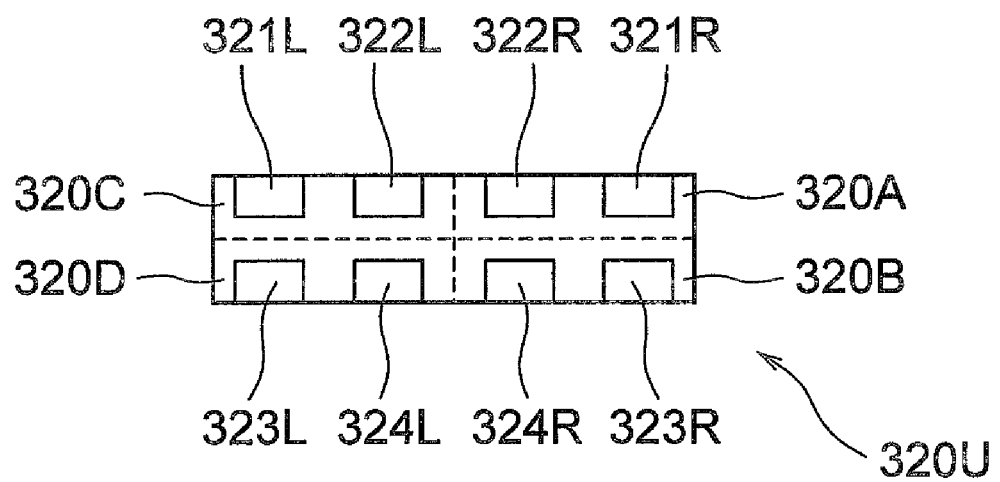
FIG. 20 is a bottom view of the multilayered piezoelectric element shown in FIG. 19.

A vibrator in the third embodiment includes the multilayered piezoelectric element 320 formed by a plurality of piezoelectric sheets stacked together and that generates the longitudinal primary resonance vibration and the torsional secondary resonance vibration by an activated area polarized in the thickness direction of the piezoelectric sheets. A structure of the multilayered piezoelectric element 320 forming the vibrator is explained below using FIGS. 17 to 20. FIG. 17 is an exploded perspective view of the structure of the multilayered piezoelectric element 320. FIG. 18A is a plan view of a structure of a first piezoelectric sheet 330. FIG. 18B is a plan view of a structure of a second piezoelectric sheet 340. FIG. 18C is a plan view of a structure of a third piezoelectric sheet 350. FIG. 19 is a perspective view from an upper front side of the multilayered piezoelectric element 320. FIG. 20 is a bottom view of the multilayered piezoelectric element 320 shown in FIG. 19.

As shown in FIG. 17, the multilayered piezoelectric element 320 includes, stacked from this side to the other side in a thickness direction (a direction indicated by an arrow S3 in FIG. 17), two first piezoelectric sheets 330, two pairs of the second piezoelectric sheets 340 and the third piezoelectric sheets 350 alternately layered, two first piezoelectric sheets 330, two pairs of the second piezoelectric sheets 340 and the third piezoelectric sheets 350 alternately layered, and two first piezoelectric sheets 330.

As shown in FIGS. 18A to 18C, the first piezoelectric sheet 330, the second piezoelectric sheet 340, and the third piezoelectric sheet 350 have an identical shape of a rectangular plate. As the first piezoelectric sheet 330, the second piezoelectric sheet 340, and the third piezoelectric sheet 350, for example, hard-type lead zirconate titanate piezoelectric elements are used. The piezoelectric element consisting of the second piezoelectric sheet 340 and the third piezoelectric sheet 350 includes an internal electrode and an activated area polarized in the thickness direction.

Concrete structures of the internal electrodes and external electrodes are explained below.

As shown in FIG. 18B, around centers of long sides (orthogonal sides in FIGS. 18A to 18C) of the second piezoelectric sheet 340, a first internal electrode 341a of +phase and a second internal electrode 342a of +phase are arranged facing to and isolated from each other.

The first internal electrode 341a of +phase and the second internal electrode 342a of +phase are extended such that their protrusions 341b and 342b are exposed to a bottom surface 340U of the second piezoelectric sheet 340. The protrusions 341b and 342b are arranged at a position isolated from each other at the bottom surface 340U of the second piezoelectric sheet 340.

As shown in FIG. 18C, a first internal electrode 351a of −phase and a second internal electrode 352a of −phase are arranged facing to each other around a center of long sides of the third piezoelectric sheet 350.

The first internal electrode 351a of −phase and the second internal electrode 352a of −phase are extended so that their protrusions 351b and 352b are exposed to a bottom surface 350U of the third piezoelectric sheet 350. The protrusions 351b and 352b are arranged at positions inner than the corresponding positions of the protrusions 341b and 342b, and isolated from each other.

External electrodes formed on the protrusion 341b compose a first external electrode group 321L of +phase and a third external electrode group 323L of +phase on a bottom surface 320U of the multilayered piezoelectric element 320. External electrodes formed on the protrusions 342b compose a first external electrode group 321R of +phase and a third external electrode group 323R of +phase on the bottom surface 320U of the multilayered piezoelectric element 320 (FIG. 20).

External electrodes formed on the protrusion 351b compose a second external electrode group 322L of −phase and a fourth external electrode group 324L of −phase on the bottom surface 320U of the multilayered piezoelectric element 320. External electrodes formed on the protrusion 352b compose a second external electrode group 322R of −phase and a fourth external electrode group 324R of −phase on the bottom surface 320U of the multilayered piezoelectric element 320 (FIG. 20).

Eight external electrodes formed on the bottom surface 320U of the multilayered piezoelectric element 320 compose four groups of phases by respectively coupling the first external electrode group 321L of +phase and the second external electrode group 322L of −phase as a pair, the third external electrode group 323L of +phase and the fourth external electrode group 324L of −phase as a pair, the first external electrode group 321R of +phase and the second external electrode group 322R of −phase as a pair, and the third external electrode group 323R of +phase and the fourth external electrode group 324R of −phase as a pair.

From another aspect, the multilayered piezoelectric element 320 consists of four regions 320A, 320B, 320C, and 320D with an angle of 90 degrees for each, separated by vertical surfaces around a central axis 300C (FIGS. 19 and 20).

The regions 320A, 3203, 320C, and 320D, respectively, correspond to the first external electrode group 321R of +phase and the second external electrode group 322R of −phase, the third external electrode group 323R of +phase and the fourth external electrode group 324R of −phase, the first external electrode group 321L of +phase and the second external electrode group 322L of −phase, and the third external electrode group 323L of +phase and the fourth external electrode group 324L of −phase. By this structure, each region is deformed to a single direction reacting to a signal applied from the external power supply, just like the multilayered piezoelectric element 120 in the first embodiment. Furthermore, other structures, operations, and advantages are the same as those of the first embodiment.

Fourth Embodiment

An ultrasonic motor according to the fourth embodiment of the present invention generates an elliptical vibration by combining a longitudinal primary resonance vibration and a torsional tertiary resonance vibration. It differs from the ultrasonic motor according to the second embodiment in the point that it includes an internal electrode pattern that enables an external electrode group to be arranged on a bottom surface of a multilayered piezoelectric element 420. Other structures are the same as those of the ultrasonic motor of the second embodiment and accordingly, the same reference symbols will be used and the descriptions of the parts other than the piezoelectric sheets are not shown in the diagrams.

Figure 21:
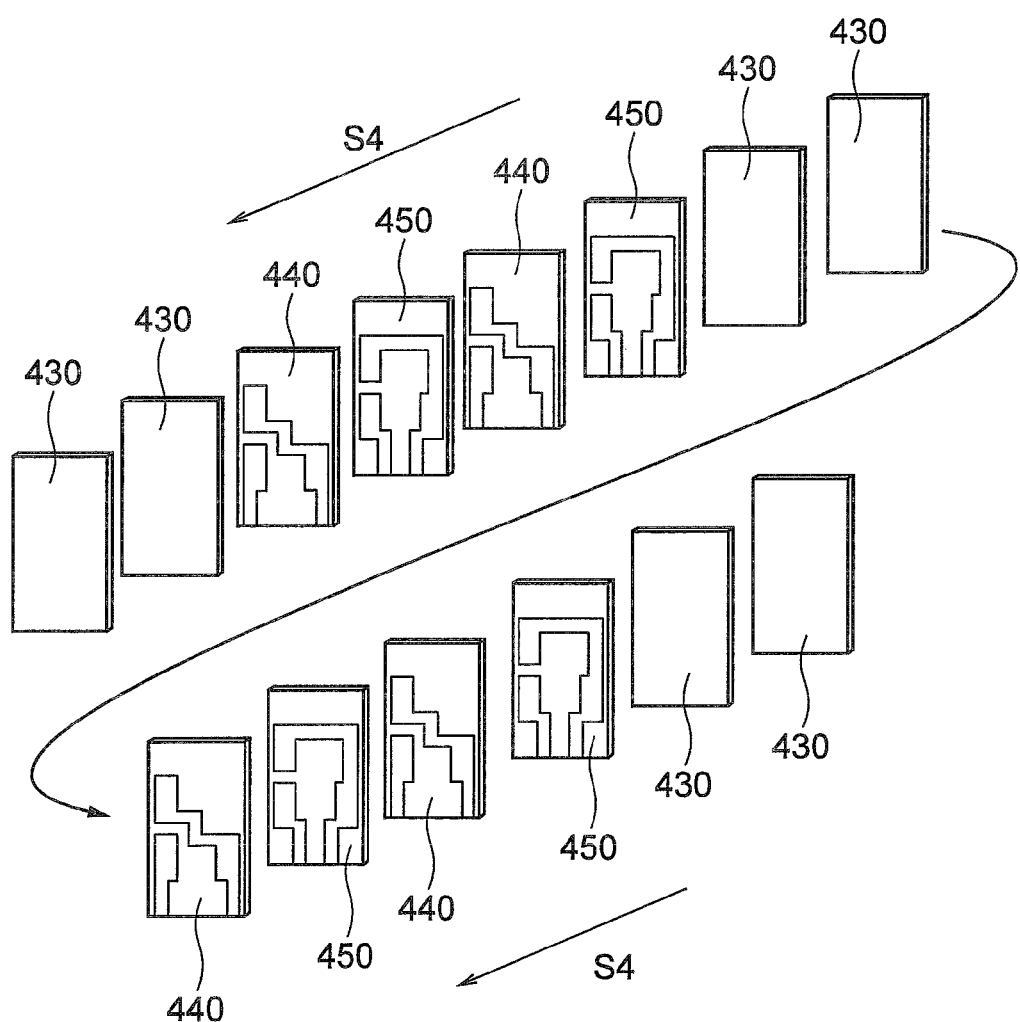
FIG. 21 is an exploded perspective view of a structure of a multilayered piezoelectric element according to a fourth embodiment.
Figure 22:
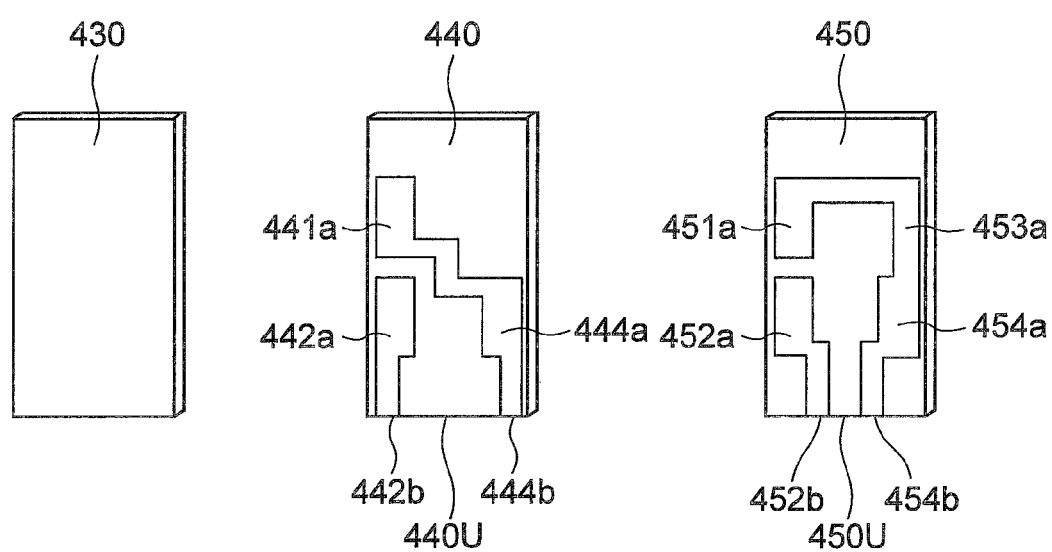
FIG. 22A is a plan view of a structure of a first piezoelectric sheet.
FIG. 22B is a plan view of a structure of a second piezoelectric sheet.
FIG. 22C is a plan view of a structure of a third piezoelectric sheet according to the fourth embodiment.
Figure 23:
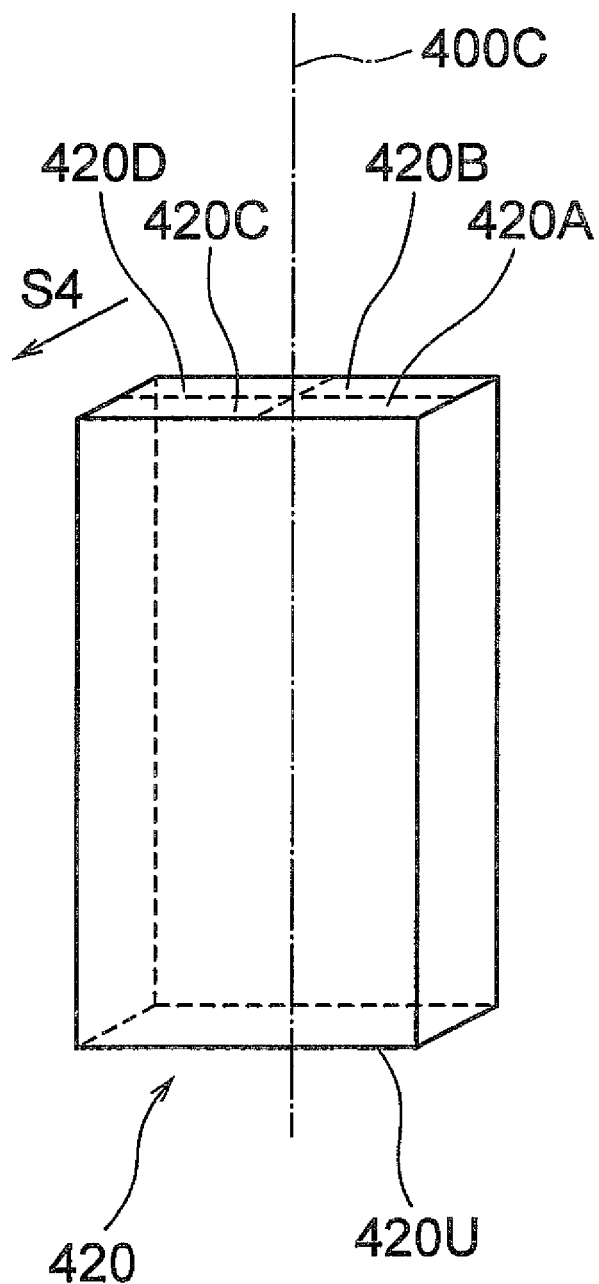
FIG. 23 is a perspective view from an upper front side of the multilayered piezoelectric element according to the fourth embodiment.
Figure 24:
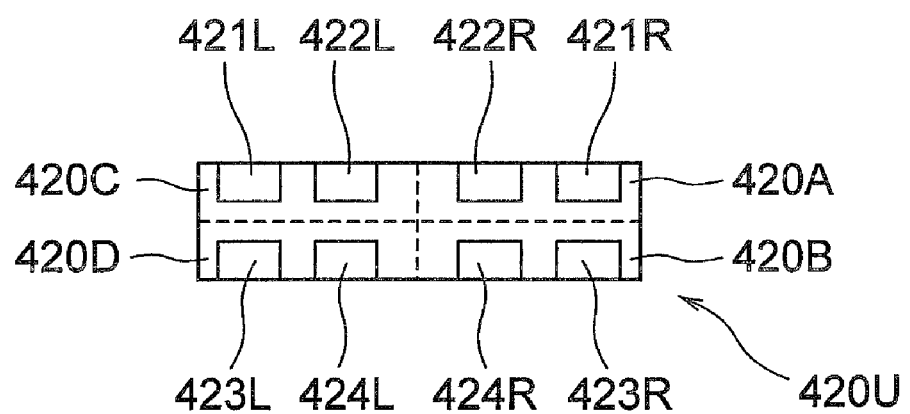
FIG. 24 is a bottom view of the multilayered piezoelectric element shown in FIG. 23.

A vibrator according to the fourth embodiment includes the multilayered piezoelectric element 420 formed by a plurality of piezoelectric sheets stacked together and that generates the longitudinal primary resonance vibration and the torsional tertiary resonance vibration by an activated area polarized in a thickness direction of the piezoelectric sheets. A structure of the multilayered piezoelectric element 420 forming the vibrator is explained below using FIGS. 21 to 24. In the explanation, FIG. 21 is an exploded perspective view of the structure of the multilayered piezoelectric element 420. FIG. 22A is a plan view of a structure of a first piezoelectric sheet 430. FIG. 22B is a plan view of a structure of a second piezoelectric sheet 440. FIG. 22C is a plan view of a structure of a third piezoelectric sheet 450. FIG. 23 is a perspective view from an upper front side of the multilayered piezoelectric element 420. FIG. 24 is a bottom view of the multilayered piezoelectric element 420 shown in. FIG. 23.

As shown in FIG. 21, the multilayered piezoelectric element 420 includes, stacked from this side to the other side in the thickness direction (a direction indicated by an arrow S4 in FIG. 21), two first piezoelectric sheets 430, two pairs of the second piezoelectric sheets 440 and the third piezoelectric sheets 450 alternately layered, two first piezoelectric sheets 430, two pairs of the second piezoelectric sheets 440 and the third piezoelectric sheets 450 alternately layered, and two first piezoelectric sheets 430.

As shown in FIGS. 22A to 22C, the first piezoelectric sheet 430, the second piezoelectric sheet 440, and the third piezoelectric sheet 450 have an identical shape of a rectangular plate. As the first piezoelectric sheet 430, the second piezoelectric sheet 440, and the third piezoelectric sheet 450, for example, hard-type lead zirconate titanate piezoelectric elements are used. The piezoelectric element consisting of the second piezoelectric sheet 440 and the third piezoelectric sheet 450 include internal electrodes and an activated area polarized in the thickness direction.

Concrete structures of the internal electrodes and external electrodes are explained below.

As shown in FIG. 22B, a first internal electrode 441a of +phase, a second internal electrode 442a of +phase, and a fourth internal electrode 444a of +phase are formed on the second piezoelectric sheet 440. The second internal electrode 442a of +phase and the fourth internal electrode 444a of +phase are arranged on a lower part of the second piezoelectric sheet 440 along a longer side (vertical direction in FIGS. 22A to 22C) facing to and isolated from each other. The first internal electrode 441a of +phase is arranged on an upper position isolated from the second internal electrode 442a of +phase.

The second internal electrode 442a of +phase is extended such that its protrusion 442b is exposed to a bottom surface 440U of the second piezoelectric sheet 440. The first internal electrode 441a of +phase is extended to the fourth internal electrode 444a of +phase. The fourth internal electrode 444a is extended so that its protrusion 444b is exposed to the bottom surface 440U of the second piezoelectric sheet 440. The protrusions 442b and 444b are arranged at a position isolated from each other at the bottom surface 440U of the second piezoelectric sheet 440.

Meanwhile, as shown in FIG. 22C, a first internal electrode 451a of −phase, a second internal electrode 452a of −phase, a wiring electrode 453a, and a fourth internal electrode 454a of −phase are formed on the third piezoelectric sheet 450. The first internal electrode 451a of −phase and the wiring electrode 453a are arranged on a higher part of the third piezoelectric sheet 450 along a longer side, facing to and isolated from each other. The second internal electrode 452a of −phase and the fourth internal electrode 454a of −phase are arranged on a lower part of the third piezoelectric sheet 450 along the longer side, facing to and isolated from each other.

The second internal electrode 452a of −phase is extended such that its protrusion 452b is exposed to a bottom surface 450U of the third piezoelectric sheet 450. The first internal electrode 451a of −phase is connected to the fourth internal electrode 454a of −phase through the wiring electrode 453a. Furthermore, the fourth internal electrode 454a of −phase is extended so that its protrusion 454b is exposed to the bottom surface 450U of the third piezoelectric sheet 450. The protrusions 452b and 454b are arranged on positions inner than the corresponding positions of the protrusions 442b and 444b and are isolated from each other on the bottom surface 450U of the third piezoelectric sheet 450.

External electrodes formed on the protrusion 442b compose a first external electrode group 421L of +phase and a third external electrode group 423L of +phase on a bottom surface 420U of the multilayered piezoelectric element 420. External electrodes formed on the protrusion 444b compose a first external electrode group 421R of +phase and a third external electrode group 423R of +phase on the bottom surface 420U of the multilayered piezoelectric element 420 (FIG. 24).

External electrodes formed on the protrusion 452b compose a second external electrode group 422L of −phase and a fourth external electrode group 424L of −phase on the bottom surface 420U of the multilayered piezoelectric element 420. External electrodes formed on the protrusion 454b compose a second external electrode group 422R of −phase and a fourth external electrode group 424R of −phase on the bottom surface 420U of the multilayered piezoelectric element 420 (FIG. 24).

Eight external electrodes formed on the bottom surface 420U of the multilayered piezoelectric element 420 compose four pairs of phases by respectively coupling the first external electrode group 421L of +phase and the second external electrode group 422L of −phase as a pair, the third external electrode group 423L of +phase and the fourth external electrode group 424L of −phase as a pair, the first external electrode group 421R of +phase and the second external electrode group 422R of −phase as a pair, and the third external electrode group 423R of +phase and the fourth external electrode group 424R of −phase as a pair.

From another aspect, the multilayered piezoelectric element 420 consists of four regions 420A, 420B, 420C, and 420D with an angle of 90 degrees for each, separated by vertical surfaces around a central axis 400C (FIGS. 23 and 24).

The regions 420A, 420B, 420C, and 420D, respectively, correspond to the first external electrode group 421R of +phase and the second external electrode group 422R of −phase, the third external electrode group 423R of +phase and the fourth external electrode group 424R of −phase, the first external electrode group 421L of +phase and the second external electrode group 422L of −phase, and the third external electrode group 423L of +phase and the fourth external electrode group 424L of −phase.

According to this structure, each region is deformed reacting to a signal applied from the external power supply. Specifically, the deformation can be generated to different directions even in one region because a pair of the first internal electrode 441a of +phase and the first internal electrode 451a of −phase, and a pair of the second internal electrode 442a of +phase and the second internal electrode 452a of −phase are of different phases. Furthermore, other structures, operations, and advantages are the same as those of the first embodiment.

As explained above, the ultrasonic motor according to the present invention is appropriate for the ultrasonic motor that rotates the rotor by generating the elliptical vibration by combining the longitudinal vibration and the torsional vibration.

The ultrasonic motor according to the present invention can generate the torsional resonance vibration efficiently by positively applying the bending movement of the piezoelectric element. Moreover, the ultrasonic motor according to the present invention consists of a single part, has a simple structure without a groove etc., can generate the longitudinal vibration and the torsional vibration easily, can generate the elliptical vibration by combining the longitudinal vibration and the torsional vibration, and can rotate the rotor by the elliptical vibration.

What is claimed is:
1. An ultrasonic motor comprising:
a vibrator having a dimension ratio of a rectangle in a cross-section orthogonal to a central axis; and
a rotor that contacts an elliptical vibration generating surface of the vibrator and that is rotation driven around the central axis that is orthogonal to the elliptical vibration generating surface of the vibrator, wherein an elliptical vibration is generated by combining a longitudinal primary resonance vibration resulting from an expansion and a contraction of the vibrator in a direction of the central axis and a torsional secondary resonance vibration or a torsional tertiary resonance vibration resulting from twisting around the central axis, the dimension ratio of the rectangle of the vibrator is chosen such that a resonance frequency of the longitudinal primary resonance vibration and a resonance frequency of the torsional secondary resonance vibration or the torsional tertiary resonance vibration match, the vibrator includes a plurality of regions in a surface orthogonal to the central axis, deformations of the regions adjacent to each other along the direction of the central axis are mutually different in the regions, and the vibrator expands and contracts in a direction orthogonal to a polarization direction thereof.

2. The ultrasonic motor according to claim 1, wherein each of the regions among the regions is deformed in a single direction to generate the torsional secondary resonance vibration.

3. The ultrasonic motor according to claim 1, wherein each of the regions among the regions is deformed in a mutually different direction to generate the torsional tertiary resonance vibration.

* * * * *